(12) United States Patent
Shu et al.

(10) Patent No.: US 11,367,217 B2
(45) Date of Patent: Jun. 21, 2022

(54) IMAGE PROCESSING METHOD AND APPARATUS, AND RELATED DEVICE

(71) Applicant: TENCENT TECHNOLOGY (SHENZHEN) COMPANY LIMITED, Shenzhen (CN)

(72) Inventors: Mao Shu, Shenzhen (CN); Si Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 17/028,906

(22) Filed: Sep. 22, 2020

(65) Prior Publication Data

US 2021/0012527 A1    Jan. 14, 2021

Related U.S. Application Data

(63) Continuation of application No. PCT/CN2019/105009, filed on Sep. 10, 2019.

(30) Foreign Application Priority Data

Sep. 12, 2018    (CN) .......................... 201811063723.0

(51) Int. Cl.
*G06T 7/73*    (2017.01)
*G06V 20/58*    (2022.01)

(52) U.S. Cl.
CPC .............. *G06T 7/74* (2017.01); *G06V 20/582* (2022.01); *G06T 2207/10028* (2013.01);
(Continued)

(58) Field of Classification Search
CPC .... G06T 7/30; G06T 7/33; G06T 7/50; G06T 7/521; G06T 7/70; G06T 7/73;
(Continued)

(56) References Cited

U.S. PATENT DOCUMENTS

2015/0022555 A1\*    1/2015    Chau ..................... G09G 5/377
345/635
2015/0163477 A1    6/2015    Klingner et al.
(Continued)

FOREIGN PATENT DOCUMENTS

CN    104766058 A    7/2015
CN    104833360 A    8/2015
(Continued)

OTHER PUBLICATIONS

The World Intellectual Property Organization (WIPO) International Search Report for PCT/CN2019/105009 dated Oct. 28, 2019 6 Pages (including translation).
(Continued)

*Primary Examiner* — Andrew W Johns
(74) *Attorney, Agent, or Firm* — Anova Law Group, PLLC

(57) ABSTRACT

An image processing method is provided for an electronic device. The method includes obtaining a target image comprising a target object; recognizing target two-dimensional location coordinates of the target object in the target image and a target attribute type corresponding to the target object; and obtaining a target three-dimensional point cloud associated with the target image. The method also include, according to a mapping relationship between the target three-dimensional point cloud and all pixels in the target image, obtaining three-dimensional location coordinates corresponding to pixels in the target two-dimensional location coordinates, as target three-dimensional location coordinates; determining a setting region in three-dimensional map data according to the target three-dimensional location coordinates; and setting the target attribute type for the target object in the setting region. Electronic device and non-
(Continued)

transitory computer-readable storage medium counterparts are also contemplated.

20 Claims, 8 Drawing Sheets

(52) U.S. Cl.
CPC ............... *G06T 2207/20021* (2013.01); *G06T 2207/20084* (2013.01); *G06T 2207/30252* (2013.01)

(58) Field of Classification Search
CPC . G06T 2207/10028; G06T 2207/20084; G06T 2207/30252; G06V 20/00; G06V 20/56; G06V 20/58; G06V 20/582; G06V 20/584; G06V 20/586; G06V 20/588; G06V 20/70; G06K 9/00; G01C 21/00; G01C 21/32; G01C 21/38; G01C 21/3804; G01C 21/3807; G01C 21/3811; G01C 21/3815; G01C 21/3819; G01C 21/3822; G01C 21/3826; G01C 21/383; G01C 21/3833
See application file for complete search history.

(56) References Cited

U.S. PATENT DOCUMENTS

| | | | |
|---|---|---|---|
| 2017/0343362 A1 | 11/2017 | Shen et al. | |
| 2018/0158206 A1 | 6/2018 | Han | |
| 2018/0181817 A1 | 6/2018 | Yan et al. | |
| 2018/0307924 A1 | 10/2018 | Zeng | |
| 2020/0175720 A1* | 6/2020 | Hsu et al. | ............ H04N 13/293 |
| 2020/0293058 A1 | 9/2020 | Fu | |
| 2020/0402251 A1* | 12/2020 | Ban et al. | ............ G06N 3/0454 |

FOREIGN PATENT DOCUMENTS

| | | |
|---|---|---|
| CN | 105260699 A | 1/2016 |
| CN | 105512646 A | 4/2016 |
| CN | 105678689 A | 6/2016 |
| CN | 105719284 A | 6/2016 |
| CN | 107316325 A | 11/2017 |
| CN | 108460395 A | 8/2018 |
| CN | 110148196 A | 8/2019 |

OTHER PUBLICATIONS

The State Intellectual Property Office of the People's Republic of China (SIPO) Office Action 1 for for 201811063723.0 dated Dec. 14, 2021 10 Pages (including translation).

* cited by examiner

IMAGE PROCESSING METHOD AND APPARATUS, AND RELATED DEVICE

RELATED APPLICATIONS

This application is a continuation application of PCT Patent Application No. PCT/CN2019/105009, filed on Sep. 10, 2019, which claims priority to Chinese Patent Application No. 201811063723.0, entitled "IMAGE PROCESSING METHOD AND APPARATUS, AND RELATED DEVICE" filed with the National Intellectual Property Administration, PRC on Sep. 12, 2018, content of all of which is incorporated by reference in its entirety.

FIELD OF THE TECHNOLOGY

This application relates to the field of computer technologies and, in particular, to an image processing method and apparatus, and a related device.

BACKGROUND

A high-precision map is a map with high precision and high definition, and the precision is required to reach a decimeter level to distinguish lanes. Nowadays, with the development of positioning technology, high-precision positioning has become possible. With the high definition, all kinds of traffic elements in a traffic scene, including road-net data, lane network data, lane lines, traffic signs, and other data, need to be stored in a formatted manner. However, current approaches on extracting traffic elements are often relying on manual editing, causing high process complexities and low efficiency.

The disclosed methods and systems are directed to solve one or more problems set forth above and other problems.

SUMMARY

Embodiments of the present disclosure provide an image processing method and apparatus, and a related device, which can automatically mark an attribute type for an object in a map, thereby improving efficiency of marking an attribute type of an object.

According to one aspect of the present disclosure, an image processing method is provided for an electronic device. The method includes obtaining a target image comprising a target object; recognizing target two-dimensional location coordinates of the target object in the target image and a target attribute type corresponding to the target object; and obtaining a target three-dimensional point cloud associated with the target image. The method also include, according to a mapping relationship between the target three-dimensional point cloud and all pixels in the target image, obtaining three-dimensional location coordinates corresponding to pixels in the target two-dimensional location coordinates, as target three-dimensional location coordinates; determining a setting region in three-dimensional map data according to the target three-dimensional location coordinates; and setting the target attribute type for the target object in the setting region.

According to another aspect of the present disclosure, an electronic device is provided. The electronic device includes a memory storing computer program instructions, and a processor coupled to the memory. When executing the computer program instructions, the processor is configured to perform: obtaining a target image comprising a target object; recognizing target two-dimensional location coordinates of the target object in the target image and a target attribute type corresponding to the target object; obtaining a target three-dimensional point cloud associated with the target image; according to a mapping relationship between the target three-dimensional point cloud and all pixels in the target image, obtaining three-dimensional location coordinates corresponding to pixels in the target two-dimensional location coordinates, as target three-dimensional location coordinates; determining a setting region in three-dimensional map data according to the target three-dimensional location coordinates; and setting the target attribute type for the target object in the setting region.

According to another aspect of the present disclosure, a non-transitory computer-readable storage medium is provided. The non-transitory computer-readable storage medium stores computer program instructions executable by at least one processor to perform: obtaining a target image comprising a target object; recognizing target two-dimensional location coordinates of the target object in the target image and a target attribute type corresponding to the target object; obtaining a target three-dimensional point cloud associated with the target image; according to a mapping relationship between the target three-dimensional point cloud and all pixels in the target image, obtaining three-dimensional location coordinates corresponding to pixels in the target two-dimensional location coordinates, as target three-dimensional location coordinates; determining a setting region in three-dimensional map data according to the target three-dimensional location coordinates; and setting the target attribute type for the target object in the setting region.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The technical solutions in the embodiments of the present disclosure are described in the following with reference to the accompanying drawings. Apparently, the embodiments to be described are merely some embodiments of the present disclosure rather than all of the embodiments. Other embodiments obtained by a person of ordinary skill in the art based on the disclosed embodiments without creative efforts shall fall within the protection scope of the present disclosure.

Currently, a traffic sign in a high-precision map is mainly constructed based on a manual editing method, that is, by traversing all road sections manually, a traffic sign is extracted from a road section at which the traffic sign is located; a type of the extracted traffic sign is recognized manually, and then the recognized type is marked for the traffic sign in the high-precision map. According to the above description, recognizing an attribute of a traffic sign in a high-precision map manually and setting an attribute type for the traffic sign involve a heavy workload and have low efficiency.

Figure 1A:
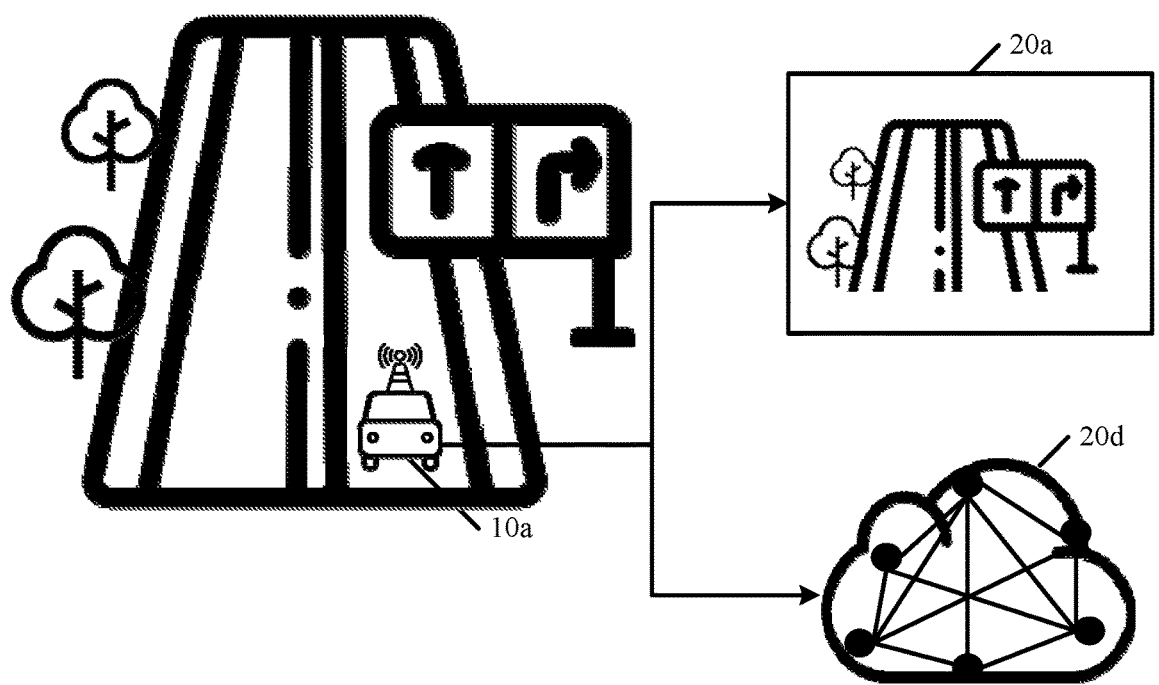
FIG. 1A is a schematic diagram of a scenario of an image processing method according to an embodiment of the present disclosure.

FIG. 1A to FIG. 1E are schematic diagrams of scenarios of an image processing method according to an embodiment of the present disclosure. As shown in FIG. 1A, to identify traffic signs in a three-dimensional map, a map acquisition vehicle 10a acquires data related to traffic signs in a road, where a three-dimensional map is a map displaying physical geography, administrative regions, and social conditions on the earth surface in a form of three-dimensional data. If there is a traffic sign in a current road section, a camera in the map acquisition vehicle 10a photographs an image including the traffic sign, and a three-dimensional point cloud of the current road section is scanned by using a three-dimensional laser scanner in the map acquisition vehicle 10a at the same time. The three-dimensional point cloud includes three-dimensional coordinates of sampling points on the surface of all objects in the current road section. In addition to the traffic sign, the objects in the current road section further include a road and trees on both sides of the road. For example, an image 20a including the traffic sign and three-dimensional point cloud data 20d associated with the image 20a are acquired.

Figure 1B:
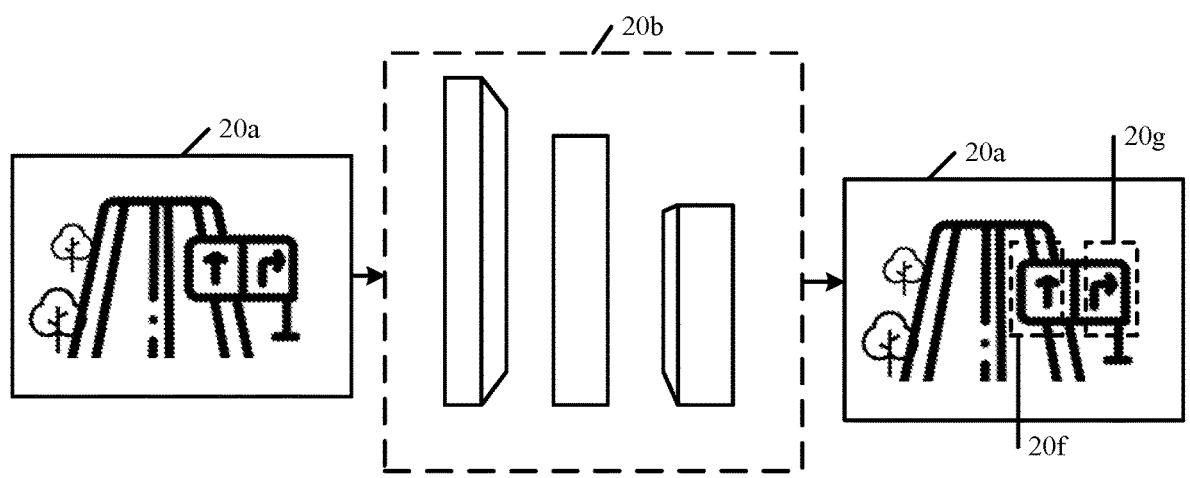
FIG. 1B is a schematic diagram of a scenario of an image processing method according to an embodiment of the present disclosure.

As shown in FIG. 1B, to automatically recognize an attribute type of the traffic sign, the image 20a including the traffic sign is recognized. The attribute type of the traffic sign includes: a vehicle warning attribute type, a pedestrian warning attribute type, a prohibition attribute type, an indication attribute type, a guide attribute type, a road construction attribute type, and the like. The image 20a is divided into a plurality of sub-images. The image 20a is inputted into a detection model 20b, and a convolution operation is performed on the image 20a based on a convolutional layer in the detection model 20b. In this case, the image is merely logically divided into a plurality of sub-images, and in actual operation, the entire image is still directly inputted into the detection model 20b.

After the convolutional layer performs the convolution operation on the image 20a, convolution feature information corresponding to each sub-image may be obtained. Two-dimensional location coordinates of the convolution feature information corresponding to each sub-image are recognized respectively, and matching degrees between the convolution feature information corresponding to each sub-image and a plurality of traffic sign attribute types in the detection model 20b are calculated respectively. A higher matching degree with an attribute type indicates a higher probability that an object in a sub-image corresponding to the convolution feature information belongs to the attribute type. The two-dimensional location coordinates include coordinates of four vertexes, and coordinates of each vertex include a horizontal coordinate and a longitudinal coordinate. It may be learned that, the two-dimensional location coordinates corresponding to each sub-image identify a rectangular region in the image 20a, and each sub-image has a corresponding rectangular region.

A maximum matching degree is used as a confidence of the rectangular region, and an attribute type corresponding to the maximum matching degree is used as a target attribute type of the rectangular region. Each sub-image corresponds to a rectangular region, and each rectangular region has a corresponding confidence and target attribute type. A physical meaning of the confidence of the rectangular region is a probability that an attribute type of an object (the object herein is a traffic sign) in the rectangular region is the target attribute type. After the two-dimensional location coordinates (the rectangular region), the confidence, and the target attribute type corresponding to each sub-image are determined, false detection results are filtered.

The filtering procedure may include: presetting a confidence threshold, deleting rectangular regions whose confidences are less than the confidence threshold, and reserving rectangular regions whose confidences are greater than or equal to the confidence threshold. As shown in FIG. 1B, in the image 20a, after filtering the false detection results, the rectangular regions reserved include: a rectangular region 20f and a rectangular region 20g. In an embodiment of the present disclosure, a confidence corresponding to the rectangular region 20f is 0.85, two-dimensional location coordinates are (100, 120), (125, 120), (100, 150), (125, 150), and a target attribute type is P1. A confidence corresponding to the rectangular region 20g is 0.92, two-dimensional location coordinates are (130, 120), (155, 120), (130, 150), (155, 150), and a target attribute type is P2. In this case, in the image 20a, the two-dimensional location coordinates of the traffic sign in the image and the target attribute type of the traffic sign are determined.

Recognizing the attribute type of the object in the image and determining a location of the object in the image belong to the range of target detection. A target detection algorithm includes a one-stage framework and a two-stage framework in deep learning. Algorithms under the one-stage framework include: You Only Look Once (YOLO), Single Shot MultiBox Detector (SSD), and the like. Algorithms under the two-stage framework include: Regions with CNN (RCNN), FAST RCNN, FASTER RCNN, and the like. When a detection model is trained, training sample images are labeled first, including labeling a location, an attribute type, and other information of an object (traffic sign). Then a deep neural network model is trained by using the labeled sample images, and a model is saved when the model converges and a certain precision is achieved. The saved model is the detection model 20b.

Figure 1C:
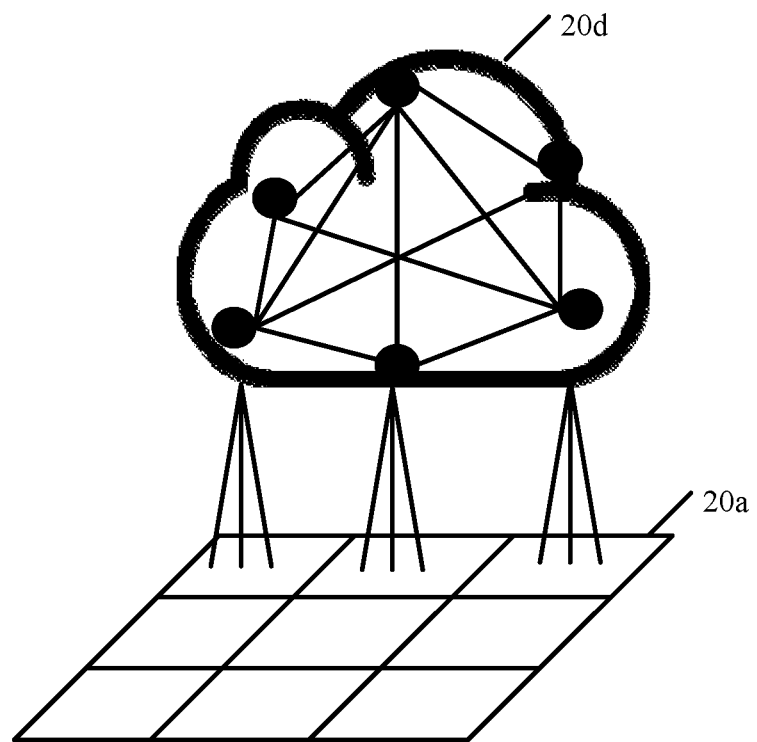
FIG. 1C is a schematic diagram of a scenario of an image processing method according to an embodiment of the present disclosure.

As shown in FIG. 1C, to automatically mark an attribute type of a traffic sign in a three-dimensional map, three-dimensional location coordinates of the traffic sign in the three-dimensional map need to be obtained first. A three-dimensional point cloud 20d obtained by a three-dimensional laser scanner is matched with an image 20a, to obtain a mapping relationship between the three-dimensional point cloud 20d and all pixels in the image 20a. According to the mapping relationship, two-dimensional coordinates of any pixel in the image 20a may be mapped as three-dimensional coordinates. According to the mapping relationship, three-dimensional coordinates corresponding to pixels where two-dimensional location coordinates of the rectangular region 20f are located may be obtained, which are referred to as target three-dimensional location coordinates. The target three-dimensional location coordinates may also be referred to as three-dimensional location coordinates of the traffic sign in the three-dimensional map. Similarly, according to the mapping relationship, three-dimensional coordinates corresponding to pixels where two-dimensional location coordinates of the rectangular region 20g are located may be obtained. In the foregoing embodiment, target three-dimensional location coordinates of a traffic sign in an image are determined according to the image and a three-dimensional point cloud corresponding to the image. If a plurality of images including traffic signs are photographed and a plurality of three-dimensional point clouds corresponding to the plurality of images are scanned (which may be images and three-dimensional point clouds obtained in the same road section, or images and three-dimensional point clouds obtained in different road sections), target three-dimensional location coordinates of traffic signs in different images may be determined by using the foregoing method.

Figure 1D:
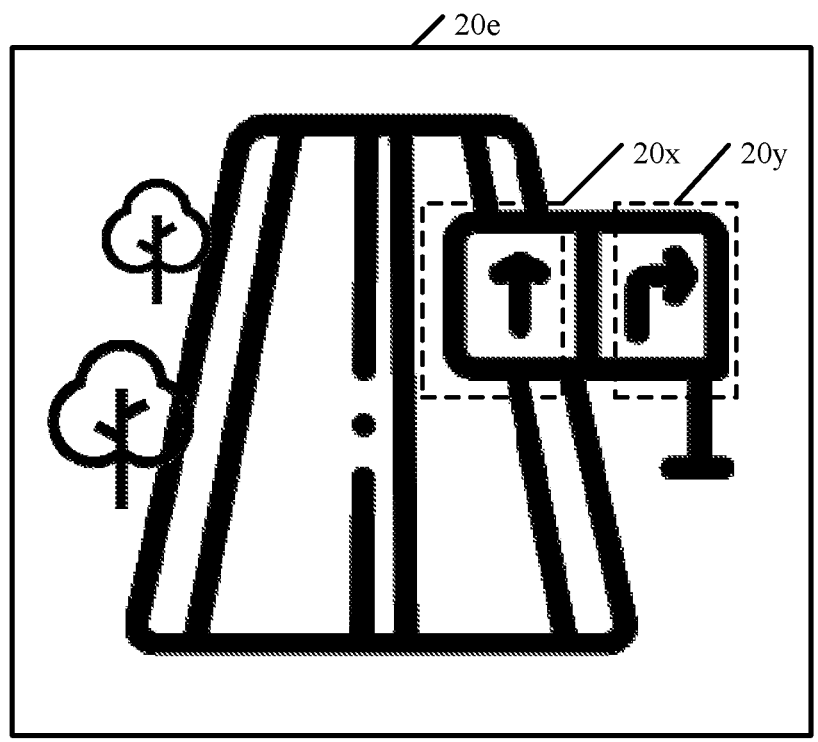
FIG. 1D is a schematic diagram of a scenario of an image processing method according to an embodiment of the present disclosure.

Subsequently, a plurality of target three-dimensional location coordinates are aggregated. Finally, a region corresponding to the three-dimensional coordinates obtained through aggregation in the three-dimensional map is used as a setting region, and a corresponding target attribute type is set for a traffic sign in the setting region. As shown in FIG. 1d, in a three-dimensional map 20e, there are two setting regions: a region 20x and a region 20y. The region 20x is a setting region in the three-dimensional map corresponding to the rectangular region 20f in the image 20a. The region 20y is a setting region in the three-dimensional map corresponding to the rectangular region 20g in the image 20a. A target attribute type P1 is set for the region 20x, and a target attribute type P2 is set for the region 20y.

Figure 1E:
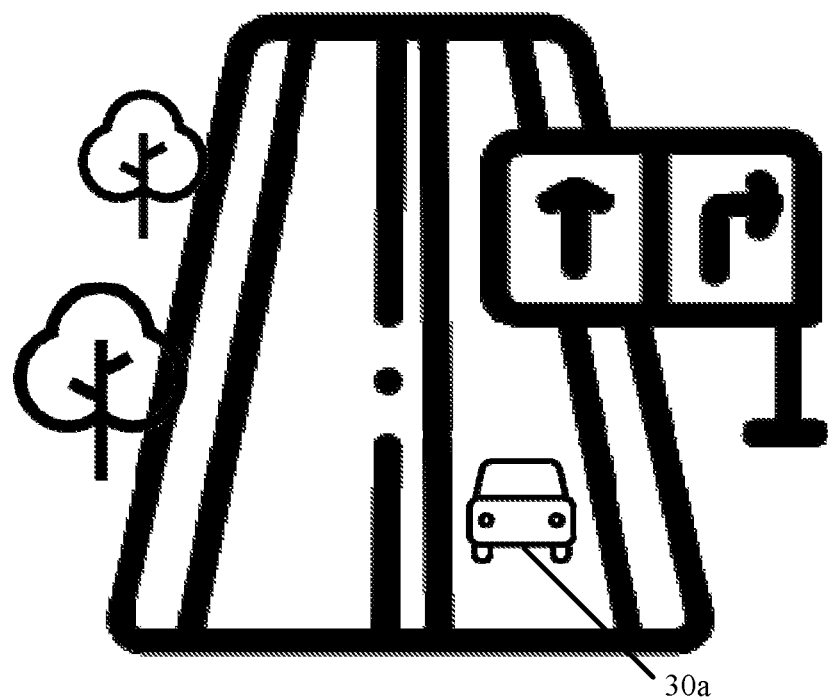
FIG. 1E is a schematic diagrams of a scenario of an image processing method according to an embodiment of the present disclosure.

After a traffic sign in the three-dimensional map is set, the traffic sign may be used for assisting self-driving cars to make a reasonable travel planning and decision. As shown in FIG. 1E, a self-driving car 30a runs on a road, and it is found that there are two traffic signs in a current road section in the three-dimensional map according to a current location and a driving direction of the self-driving car 30a, and attribute types thereof are a P1 (indicating to go straight) and a P2 (indicating to turn right). To improve accuracy of driving route planning, the self-driving car 30a may photograph an image including a traffic sign in the current road section, and recognize an attribute type of the traffic sign in the image in real time. A next planned route of the self-driving car 30a may be, according to the found attribute type of the traffic sign and the attribute type of the traffic sign recognized in real time, to go straight or to turn right at a next crossing.

During setting of an attribute type for an object (a traffic sign) in a map, recognizing an attribute type, looking up a region in which an object is located, and marking an attribute type for the object are all automatically completed by an electronic device such as a server or a terminal without any human intervention, so that efficiency of marking an attribute type for an object in a map can be improved.

Figure 2:
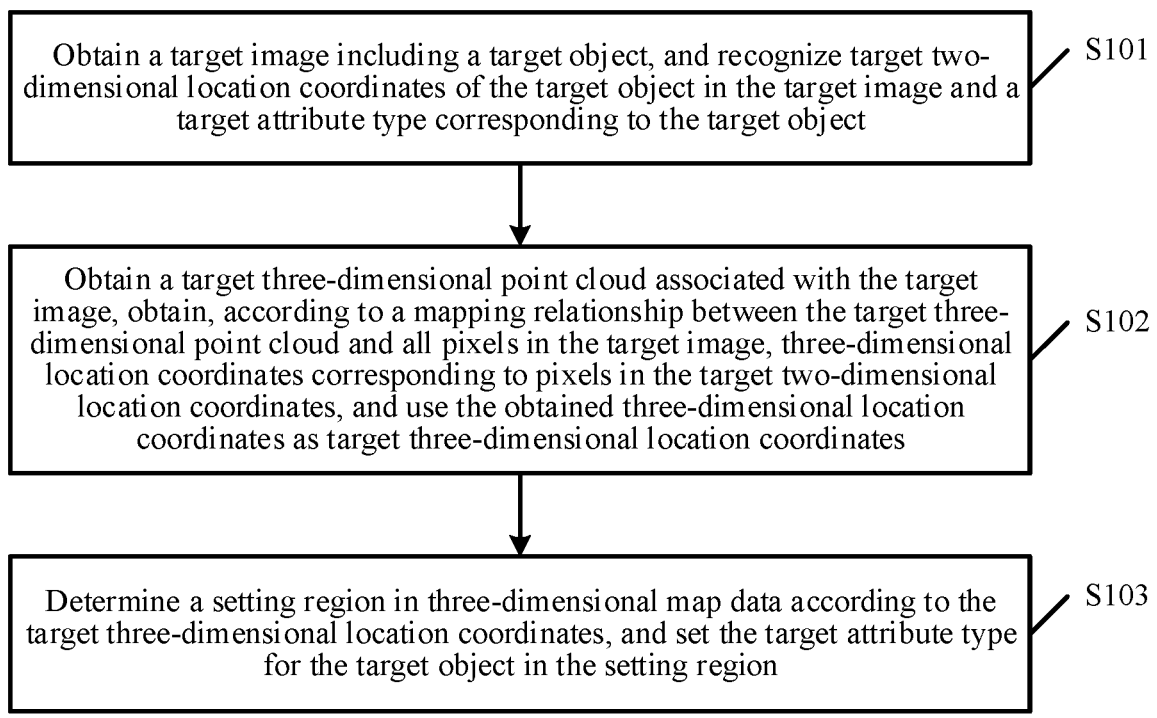
FIG. 2 is a schematic flowchart of an image processing method according to an embodiment of the present disclosure.
Figure 3:
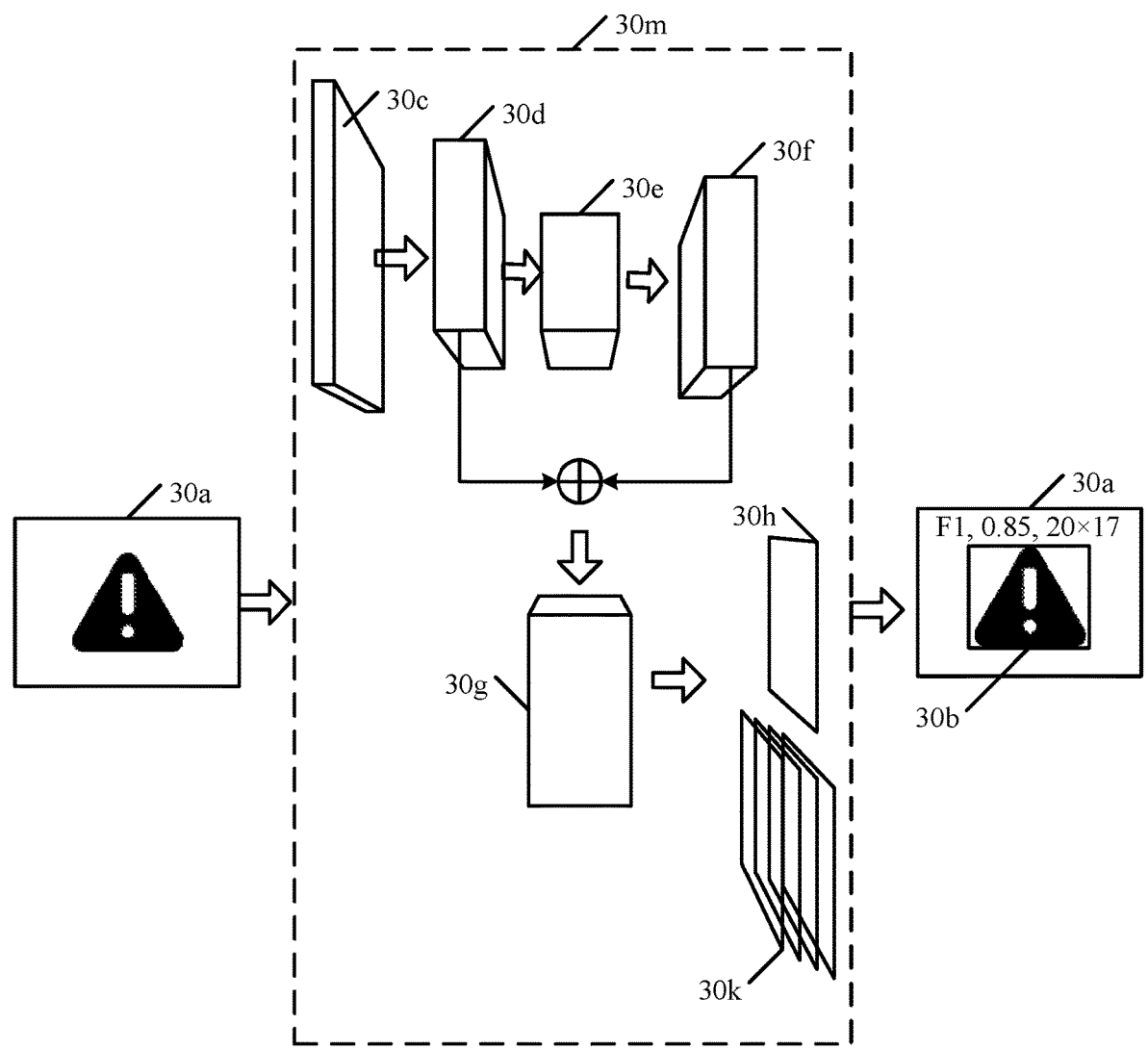
FIG. 3 is a schematic structural diagram of recognizing a target attribute type according to an embodiment of the present disclosure.
Figure 4:
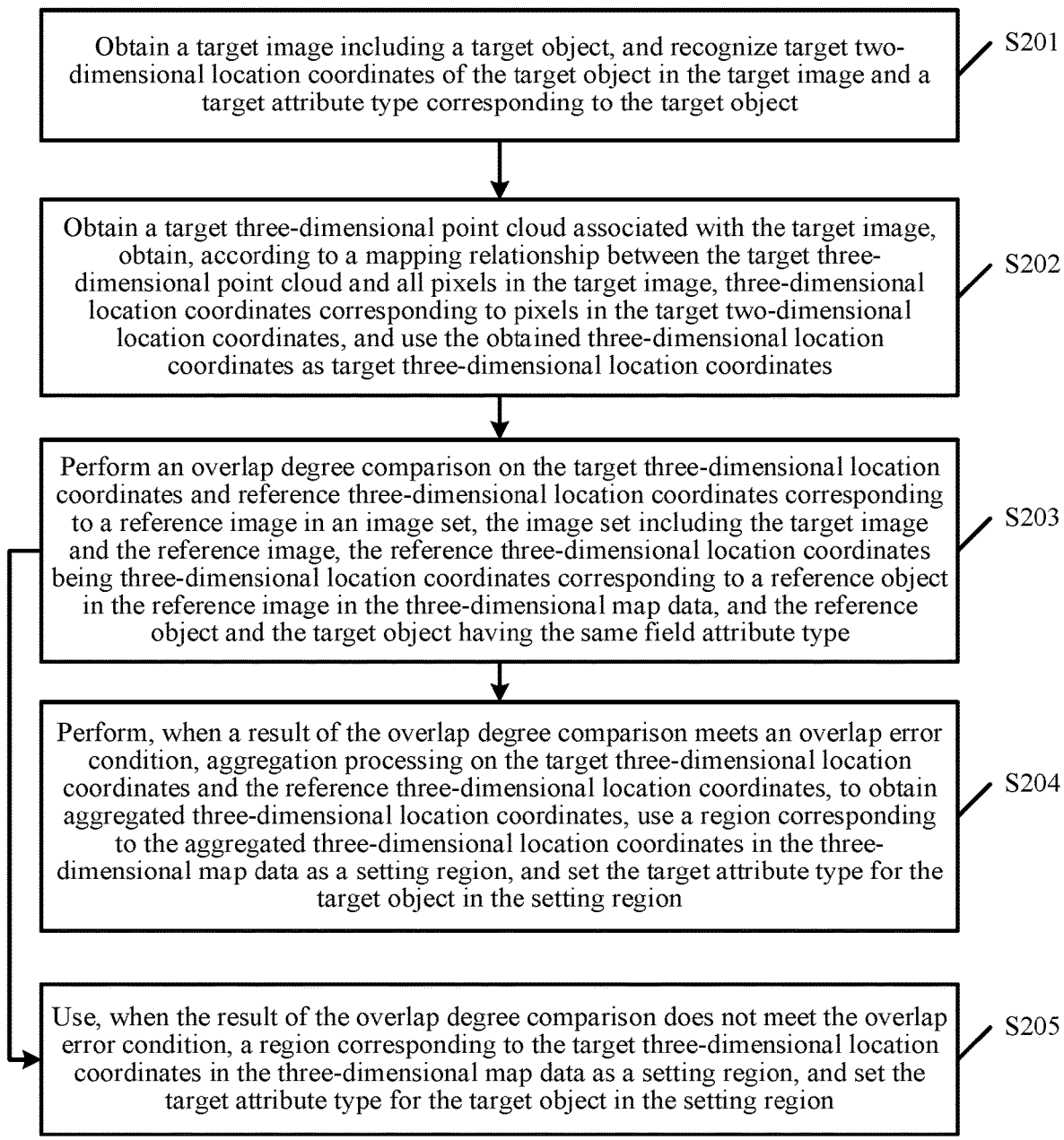
FIG. 4 is a schematic flowchart of another image processing method according to an embodiment of the present disclosure.

For specific procedures of detecting two-dimensional location coordinates of a target object (for example, a traffic sign in the foregoing embodiments corresponding to FIG. 1A to FIG. 1D) in an image and obtaining three-dimensional location coordinates of the target object, reference may be made to the following embodiments corresponding to FIG. 2 to FIG. 4.

Figure 1F:
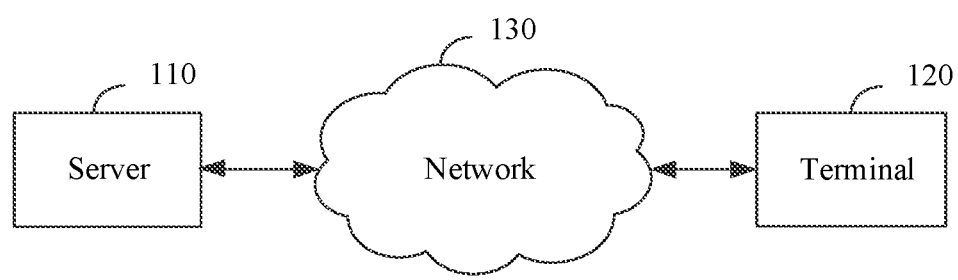
FIG. 1F is a schematic diagram of an implementation environment of an image processing method according to an embodiment of the present disclosure.

FIG. 1F is a schematic diagram of an implementation environment of an image processing method according to an embodiment of the present disclosure. An image processing apparatus provided in any embodiment of the present disclosure is integrated in a server 110 or a terminal 120, to implement the image processing method provided in any embodiment of the present disclosure. The server 110 and the terminal 120 are connected through a network 130, and the network 130 may be a wired network or a wireless network.

FIG. 2 is a schematic flowchart of an image processing method according to an embodiment of the present disclosure. The method may be performed by an electronic device. As shown in FIG. 2, the image processing method may include the followings.

S101. Obtain a target image including a target object, and recognize target two-dimensional location coordinates of the target object in the target image and a target attribute type corresponding to the target object.

Specifically, attribute types are set for objects (for example, traffic signs and lane lines) in a three-dimensional map (that is, a high-precision map is constructed, where a high-precision map refers to a map with high precision and fine definition, and therefore, three-dimensional map data including an object and an attribute type corresponding to the object may be referred to as a high-precision map). Using the China map as an example, the China map is a three-dimensional map including road-net data. In the China map, corresponding attribute types are set for each traffic sign, each lane line, and the like in each road in each city. A map obtained after the setting may be referred to as a China high-precision map. Certainly, if more diversified object types are set, it indicates a more precise China high-precision map. Raw data acquired by different frontend devices may be transmitted to a backend server, and then the server recognizes the raw data uniformly, to construct a high-precision map. Alternatively, the frontend devices directly process the acquired raw data, and transmit results obtained after the processing to the backend server. Then, the backend server splices the results obtained after the processing, to construct a high-precision map. The following embodiment shows a specific procedure in which a server recognizes an attribute type of an object included in an image (referred to as a target image) and constructs a partial high-precision map. Certainly, a corresponding attribute type may be set for an object in each region in the three-dimensional map data by using the same manner.

The server obtains a to-be-recognized image, which is referred to as a target image (for example, the image 20a in the embodiments shown in FIG. 1A), and the target image includes a target object (for example, the traffic sign in the embodiments shown in FIG. 1A), where the target object may be a traffic sign, a lane line, a traffic light, or the like.

Based on a target detection model (for example, the detection model 20b in the embodiments shown in FIG. 1B) obtained through training, the server recognizes location coordinates (referred to as target two-dimensional location coordinates) of the target object in the target image, and recognizes an attribute type (referred to as a target attribute type) of the target object. The target two-dimensional location coordinates include two-dimensional coordinates of four vertexes, and the two-dimensional coordinates of the four vertexes may be expressed as vertex coordinates (the vertex coordinates include a vertex horizontal coordinate and a vertex longitudinal coordinate) of four vertexes of a rectangular region in which the target object is located in the target image.

The target object may correspond to a plurality of attribute types. For example, when the target object is a traffic sign, the attribute type may include: a vehicle warning attribute type, a pedestrian warning attribute type, a prohibition attribute type, an indication attribute type, a guide attribute type, a road construction attribute type, and the like. The foregoing attribute types may further be subdivided. For example, the vehicle warning attribute type is further subdivided into: a vehicle height limitation attribute type, a vehicle speed limitation attribute type, a vehicle weight limitation attribute type, and the like. The guide attribute type may be subdivided into: a guide-to-left attribute type, a guide-to-right attribute type, and the like. When the target object is a lane line, the attribute type may include a straight attribute type, a U-turn attribute type, and the like.

A specific procedure of recognizing, by the server based on the target detection model, the target two-dimensional location coordinates of the target object in the target image and the target attribute type of the target object may be as follows: the server adjusts a size of the target image to a preset size first, then divides the target image into a plurality of sub-images with the same size, which are referred to as target sub-images. The server inputs the entire target image into an input layer in the target detection model, and performs convolution processing on the target image based on a convolutional layer in the target detection model. The convolutional layer includes a forward convolutional layer and a backward convolutional layer. The forward convolutional layer performs forward convolution processing (the quantity of convolution feature maps is increased but a size of each convolution feature map is reduced after the forward convolution processing, and the convolution feature map is an image formed by convolution feature information), and the backward convolutional layer performs backward convolution processing (the quantity of convolution feature maps is reduced but a size of each convolution feature map is increased after the backward convolution processing).

In order of execution, the target detection model starts with a plurality of forward convolutional layers and ends with backward convolutional layers. In all the forward convolutional layers, a forward convolutional layer (the last forward convolutional layer) located at the top is referred to as a second convolutional layer, and a forward convolutional layer adjacent to the second convolutional layer is referred to as a first convolutional layer; alternatively, all convolutional layers in the forward convolutional layers except the second convolutional layer are first convolutional layers. The quantity of the first convolutional layers is not limited, but there is only one second convolutional layer, and there is only one backward convolutional layer.

The server performs forward convolution processing on the target images based on the first convolutional layer in the target detection model. That is, a small part of feature information in the target image is randomly selected as a sample (a convolution kernel), and the sample is used as a window to slide through all the target images in turn. That is, a convolution operation is performed on the sample and the target images, so as to obtain convolution feature information about the target object in the target images. Because the target image is logically divided into a plurality of target sub-images, convolution feature information about the target object in each target sub-image is obtained, which is referred to as first convolution feature information corresponding to each target sub-image. Similarly, the server performs forward convolution processing on the first convolution feature information corresponding to all the target sub-images based on the second convolutional layer in the target detection model, to obtain second convolution feature information corresponding to each target sub-image.

Compared with the first convolution feature information, the second convolution feature information includes a deeper feature of the target object. The server performs backward convolution processing on the second convolution feature information corresponding to all the target sub-images based on the backward convolutional layer in the target detection model, to obtain third convolution feature information corresponding to each target sub-image. It may be learned that, a convolution feature map formed by the third convolution feature information and a convolution feature map formed by the first convolution feature information have the same size. For the first convolution feature information corresponding to each target sub-image and the third convolution feature information corresponding to each target sub-image, the server performs a connection operation on the first convolution feature information and the third convolution feature information that belong to the same target sub-image, and uses a result obtained after the connection operation as target convolution feature information corresponding to each target sub-image.

For example, a size of the first convolution feature information corresponding to a target sub-image A is: 120*120*30, which represents that there are 30 convolution feature maps, and a size of each convolution feature map is 120*120. A size of the third convolution feature information corresponding to the target sub-image A is 120*120*30, and a size of the target convolution feature information corresponding to the target sub-image A after the connection operation is 120*120*60. The target convolution feature information includes a feature corresponding to the forward convolution and a feature corresponding to the back convolution, and has a better capability of sensing a target object of a relatively small size.

After determining the target convolution feature information corresponding to each target sub-image, the server recognizes the target two-dimensional location coordinates and the target attribute type. Target convolution feature information corresponding to a target sub-image is used as an example for description below. The server recognizes matching probabilities between the target convolution feature information and a plurality of attribute types in the target detection model, and the quantity of the recognized matching probabilities is the same as the quantity of the attribute types in the target detection model. The server recognizes location coordinates corresponding to the target convolution feature information, and uses a region of the recognized location coordinates in the target image as a first region, determines a maximum matching probability as a confidence corresponding to the first region, and uses an attribute type corresponding to the maximum matching probability as an attribute type corresponding to the first region.

For example, it is recognized that a matching probability between target convolution feature information A and an attribute type 1 in the target detection model is 0.8; a matching probability between the target convolution feature information A and an attribute type 2 in the target detection model is 0.2; and a matching probability between the target convolution feature information A and an attribute type 3 in the target detection model is 0.15. Location coordinates corresponding to the target convolution feature information A are (50, 60), (50, 100), (90, 60), (90, 100), and the location coordinates (50, 60), (50, 100), (90, 60), (90, 100) represent coordinates of four vertexes respectively, and the coordinates of each vertex include a horizontal coordinate and a longitudinal coordinate. In the target image, a rectangular region with vertex coordinates being (50, 60), (50, 100), (90, 60), (90, 100) is determined as a first region, a confidence corresponding to the first region is 0.8, and an attribute type corresponding to the first region is the attribute type 1. For the confidence, in terms of probability, in the target image, a probability that the first region with the vertex coordinates being (50, 60), (50, 100), (90, 60), (90, 100) includes the target object with the attribute type 1 is 0.8. For a plurality of target sub-images, each target sub-image has a corresponding first region, a confidence of the first region, and an attribute type of the first region.

Next, the server filters the recognized results. The server determines a first region whose confidence is greater than a confidence threshold as a second region, and deletes a first region whose confidence is less than or equal to the confidence threshold, the deleted first region is not involved in a subsequent calculation. The server determines location coordinates corresponding to the second region as target two-dimensional location coordinates, and determines an attribute type corresponding to the second region as a target attribute type. As can be learned from the above, even if the target image includes target objects of a plurality of different attribute types, target attribute types corresponding to a plurality of target objects in the same target image may be detected based on the target detection model at the same time.

FIG. 3 is a schematic structural diagram of recognizing a target attribute type according to an embodiment of the present disclosure. A target image 30a including a target object is inputted into a target detection model 30m. According to order of execution, the target detection model 30m includes two first convolutional layers, a second convolutional layer, and a backward convolutional layer. The first convolutional layers and the second convolutional layer perform a forward convolution operation, and the backward convolutional layer performs a backward convolution operation.

The server performs forward convolution processing on the target image 30a based on the first convolutional layer in the target detection model 30m, to obtain superficial convolution feature information corresponding to all the target sub-images respectively, which is referred to as first convolution feature information 30c. The server performs forward convolution processing on the first convolution feature information 30c corresponding to all the target sub-images respectively based on the first convolutional layer in the target detection model 30m, to obtain relatively deep convolution feature information corresponding to all the target sub-images respectively, which is referred to as first convolution feature information 30d. The server performs forward convolution processing on the first convolution feature information 30d corresponding to all the target sub-images respectively based on the second convolutional layer in the target detection model 30m, to obtain deep convolution feature information corresponding to all the target sub-images respectively, which is referred to as second convolution feature information 30e.

The server performs backward convolution processing on the second convolution feature information 30e corresponding to all the target sub-images respectively based on the backward convolutional layer in the target detection model 30m, to obtain deeper convolution feature information corresponding to all the target sub-images respectively, which is referred to as third convolution feature information 30f. In the first convolution feature information 30d and the third convolution feature information 30f, the server splices the first convolution feature information and the third convolution feature information that belong to the same target sub-image, to obtain target convolution feature information 30g corresponding to each target sub-image. Because the target convolution feature information is formed by performing the forward convolution and the back convolution alternately, the target convolution feature information has a good capability of sensing a relatively small target object.

For each target sub-image, the server recognizes matching probabilities 30h between the target convolution feature information corresponding to the target sub-image and a plurality of attribute types, and the quantity of the matching probabilities is the same as the quantity of the attribute types. The server recognizes location coordinates 30k of the target convolution feature information corresponding to the target sub-image, the location coordinates representing coordinates of four vertexes of a rectangular region. A region corresponding to the location coordinates in the target image 30a is referred to as a first region, and the server uses an attribute type corresponding to a maximum matching probability as an attribute type corresponding to the first region, and uses the maximum matching probability as a confidence corresponding to the first region. After a plurality of first regions are screened according to the confidences, in the image 30a, a region 30b obtained after the screening is identified, a target attribute type F1 corresponding to the region 30b is identified, and a confidence 0.85 corresponding to the region 30b is identified. To help a user observe, a size of "20×17" of the region 30b may also be identified in the target image 30a.

S102. Obtain a target three-dimensional point cloud associated with the target image, obtain, according to a mapping relationship between the target three-dimensional point cloud and all pixels in the target image, three-dimensional location coordinates corresponding to pixels in the target two-dimensional location coordinates, and use the obtained three-dimensional location coordinates as target three-dimensional location coordinates.

Specifically, the server obtains a three-dimensional point cloud (for example, the three-dimensional point cloud 20d in the embodiments shown in FIG. 1A) associated with the target image, which is referred to as the target three-dimensional point cloud. The target three-dimensional point cloud may be obtained in the following manner: when a camera in a frontend device photographs a target image, a laser scanner also scans a three-dimensional point cloud of a current scene at the same time. In this case, it is ensured that the target image and the target three-dimensional point cloud are data of the same scene and the same angle, but of different types. Certainly, the camera and the laser scanner need to be placed at the same location, and the obtained data needs to be transmitted to the server together. To establish the mapping relationship between the target three-dimensional point cloud and the target image, the server may project the target three-dimensional point cloud into an image first, then establish the mapping relationship between the target three-dimensional point cloud and the target image by using the image obtained through projection as a medium. A specific procedure is as follows: the server first projects each discrete point in the target three-dimensional point cloud to an image plane (an XOY plane) vertically to obtain a vertical angle, and similarly, projects each discrete point in the target three-dimensional point cloud to the image plane horizontally to obtain a horizontal angle. The horizontal angle and the vertical angle obtained through projection are used as sample values, and the sample values are sampled according to a cell value corresponding to the target three-dimensional point cloud. The server quantifies the sample values obtained through sampling, that is, to convert an intensity vector, a depth vector, or a normal vector of spectral reflected energy, to obtain a projection image corresponding to the target three-dimensional point cloud, which is referred to as an auxiliary image. The foregoing sampling is to reduce the amount of calculation, and alternatively, the sampling may not be performed, and all the sample values are quantified directly to obtain an auxiliary image. Based on Moravec operators, Forstner operators, or the like, feature points are extracted from the auxiliary image and the target image respectively, and tie points between the two images are determined according to the extracted feature points.

Finally, the server uses the tie points as control points to establish the mapping relationship between the target three-dimensional point cloud and all the pixels in the target image, that is, in the target image, the two-dimensional coordinates of all the pixels in the target image have respective corresponding three-dimensional location coordinates according to the established mapping relationship. According to the mapping relationship, the server determines three-dimensional location coordinates corresponding to pixels located in the target two-dimensional location coordinates as target three-dimensional location coordinates. The target three-dimensional location coordinates are three-dimensional location coordinates of a region where the target object is located in the three-dimensional map data.

S103. Determine a setting region in three-dimensional map data according to the target three-dimensional location coordinates, and set the target attribute type for the target object in the setting region.

Specifically, to improve the precision of the setting region in the three-dimensional map data, the server may aggregate three-dimensional location coordinates about objects in different images. To distinguish from the target image, an image including a reference object is referred to as a reference image, and the reference object and the target object have the same field attribute type. For example, when a field attribute type is a traffic sign, images including a traffic sign (a specific type of the traffic sign is not limited) except the target image are referred to as reference images, and a set formed by the target image and the reference images is referred to as an image set. In another example, when photographing a traffic sign on a road, an image photographed at a horizontal distance of 20 meters away from a traffic sign A is referred to as a target image, and an image photographed at a horizontal distance of 10 meters away from the traffic sign A is referred to as a reference image. Correspondingly, the server uses three-dimensional location coordinates of the reference object in the three-dimensional map data as reference three-dimensional location coordinates.

For a specific procedure of calculating the reference three-dimensional location coordinates, reference may be made to S101 and S102 of calculating the target three-dimensional location coordinates in the embodiment corresponding to FIG. 2. The server performs an overlap degree comparison on the target three-dimensional location coordinates and the reference three-dimensional location coordinates, that is, calculates a similarity between the target three-dimensional location coordinates and the reference three-dimensional location coordinates. If the similarity is less than a similarity threshold, it indicates that a result of the overlap degree comparison meets an overlap error condition, and aggregation processing is performed on target three-dimensional location coordinates and reference three-dimensional location coordinates that meet the overlap error condition. Three-dimensional location coordinates obtained after the aggregation processing are referred to as aggregated three-dimensional location coordinates. If there are a plurality of reference three-dimensional location coordinates meeting the overlap error condition, the aggregation processing is performed on the plurality of reference three-dimensional location coordinates and the target three-dimensional location coordinates, to obtain aggregated three-dimensional location coordinates. In the three-dimensional map data, the server uses a region corresponding to the aggregated three-dimensional location coordinates as a setting region. After the setting region is determined, the target attribute type may be set for the target object in the setting region.

As can be learned from the above, a premise of the aggregation processing is a relatively high similarity between the target three-dimensional location coordinates and the reference three-dimensional location coordinates, that is, the target three-dimensional location coordinates and the reference three-dimensional location coordinates correspond to an object at the same location in the three-dimensional map data. To reduce the amount of calculation, the server may screen the reference images first. In the reference images, the server calculates similarities between the target three-dimensional location coordinates and reference three-dimensional location coordinates corresponding to reference images that are photographed in a similar period of time as the target image. Alternatively, the server calculates similarities between the target three-dimensional location coordinates and reference three-dimensional location coordinates corresponding to reference images whose scene information is the same as that of the target image. On the contrary, reference three-dimensional location coordinates of reference images that are photographed long ago or long after or reference three-dimensional location coordinates of reference images with very different scene information are not involved in a subsequent calculation.

If the similarity between the target three-dimensional location coordinates and the reference three-dimensional location coordinates is greater than or equal to the similarity threshold, it indicates that the result of the overlap degree comparison does not meet the overlap error condition. In the three-dimensional map data, the server uses a region corresponding to the target three-dimensional location coordinates as a setting region. After the setting region is determined, the server may set the target attribute type for the target object in the setting region.

Certainly, if there is no reference image, that is, the image set includes the target image only, the server may directly use a region corresponding to the target three-dimensional location coordinates in the three-dimensional map data as the setting region, and set the target attribute type for the target object in the setting region. If there are a plurality of pieces of target three-dimensional location information corresponding to the target image, the server uses regions of the plurality of pieces of target three-dimensional location information in the three-dimensional map data as setting regions, and sets a corresponding target attribute type for the target object in each setting region.

The foregoing S101 to S103 may be performed by a server. The server recognizes an attribute type of an object in an image, then sets an attribute type for an object in three-dimensional map data, to construct a high-precision map. The high-precision map is three-dimensional map data for identifying traffic elements in a road and corresponding attribute types, and more diversified traffic elements indicate a higher precision of the high-precision map. In an embodiment of the present disclosure, S101 to S103 may be alternatively performed by a frontend device. That is, the frontend device directly recognizes an attribute type of an object in an acquired image, and then the frontend device sets an attribute type for an object in three-dimensional map data. Because a frontend device sets an attribute type for an object in partial three-dimensional map data, subsequently, partial three-dimensional map data set by a plurality of frontend devices may be transmitted to the server, and the server combines a plurality pieces of partial three-dimensional map data including object attribute types into a complete high-precision map.

According to the embodiments of the present disclosure, a target image including a target object is obtained, and target two-dimensional location coordinates of the target object in the target image and a target attribute type corresponding to the target object are recognized; a target three-dimensional point cloud associated with the target image is obtained, three-dimensional location coordinates corresponding to pixels in the target two-dimensional location coordinates are obtained according to a mapping relationship between the target three-dimensional point cloud and all pixels in the target image, and the obtained three-dimensional location coordinates are used as target three-dimensional location coordinates; and a setting region is determined in three-dimensional map data according to the target three-dimensional location coordinates, and a target attribute type is set for the target object in the setting region. As can be learned from the above, according to the solution of the present disclosure, an attribute type of an object is recognized automatically from an image including the object. At the same time, three-dimensional location coordinates of the object in a map may be determined automatically according to two-dimensional coordinates of the object in the image and three-dimensional point cloud data, and then an attribute type of the object is set in a region where the three-dimensional location coordinates are located. Therefore, during setting of an attribute type for an object in a map, recognizing an attribute type, looking up a region in which an object is located, and marking an attribute type for the object are all automatically completed by an electronic device such as a server or a terminal without any human intervention, so that efficiency of marking an attribute type for an object in a map can be improved.

FIG. 4 is a schematic flowchart of another image processing method according to an embodiment of the present disclosure. The method may be performed by an electronic device. As shown in FIG. 4, the image processing method may include the following steps.

S201. Obtain a target image including a target object, and recognize target two-dimensional location coordinates of the target object in the target image and a target attribute type corresponding to the target object.

S202. Obtain a target three-dimensional point cloud associated with the target image, obtain, according to a mapping relationship between the target three-dimensional point cloud and all pixels in the target image, three-dimensional location coordinates corresponding to the pixels in the target two-dimensional location coordinates, and use the obtained three-dimensional location coordinates as target three-dimensional location coordinates.

For a specific implementation of S201 to S203, reference may be made to S101 and S102 in the embodiments corresponding to FIG. 2. Details are not described herein again.

S203. Perform an overlap degree comparison on the target three-dimensional location coordinates and reference three-dimensional location coordinates corresponding to a reference image in an image set, the image set including the target image and the reference image, the reference three-dimensional location coordinates being three-dimensional location coordinates corresponding to a reference object in the reference image in the three-dimensional map data, and the reference object and the target object having the same field attribute type.

Specifically, if there is a reference image including a reference object, three-dimensional location coordinates corresponding to the reference object are referred to as reference three-dimensional location coordinates, and the server performs an overlap degree comparison on the reference three-dimensional location coordinates and the target three-dimensional location coordinates. If a similarity between the target three-dimensional location coordinates and the reference three-dimensional location coordinates is less than a similarity threshold, it indicates that a result of the overlap degree comparison meets an overlap error condition. If the similarity between the target three-dimensional location coordinates and the reference three-dimensional location coordinates is greater than or equal to the similarity threshold, it indicates that the result of the overlap degree comparison does not meet the overlap error condition. If the result of the overlap degree comparison meets the overlap error condition, S204 is performed. If the result of the overlap degree comparison does not meet the overlap error condition, S205 is performed. The reference object and the target image the same field attribute type. For example, when the field attribute type is a traffic light, each image including a traffic light except the target image is referred to as a reference image.

If there is no reference image, a region of the target three-dimensional location coordinates in the three-dimensional map data is used as a setting region directly, and the attribute type of the target object is set in the setting region.

S204. Perform, when a result of the overlap degree comparison meets an overlap error condition, aggregation processing on the target three-dimensional location coordinates and the reference three-dimensional location coordinates, to obtain aggregated three-dimensional location coordinates, use a region corresponding to the aggregated three-dimensional location coordinates in the three-dimensional map data as a setting region; and set the target attribute type for the target object in the setting region.

Specifically, if the result of the overlap degree comparison meets the overlap error condition, the server determines both the target three-dimensional location coordinates and the reference three-dimensional location coordinates as auxiliary three-dimensional location coordinates, and combines all auxiliary three-dimensional location coordinates into a set, which is referred to as an auxiliary three-dimensional location coordinates set. In the auxiliary three-dimensional location coordinates set, the server randomly extracts a pair of auxiliary three-dimensional location coordinates, which are referred to as first location coordinates and second location coordinates respectively. The server performs aggregation processing on the first location coordinates and the second location coordinates, and coordinates obtained after the processing are referred to as third location coordinates. The server detects whether the auxiliary three-dimensional location coordinates set is an empty set. If the auxiliary three-dimensional location coordinates set is not an empty set, the server extracts next auxiliary three-dimensional location coordinates from the auxiliary three-dimensional location coordinates set as first location coordinates, determines the third location coordinates obtained through aggregation processing as second location coordinates, and performs aggregation processing on the new first location coordinates and second location coordinates again, to obtain third location coordinates again.

The server detects whether the auxiliary three-dimensional location coordinates set is an empty set again. If the auxiliary three-dimensional location coordinates set is not an empty set, the server extracts next auxiliary three-dimensional location coordinates from the auxiliary three-dimensional location coordinates set as first location coordinates again, determines the new third location coordinates as second location coordinates, and performs aggregation processing on the first location coordinates and the second location coordinates again, to obtain third location coordinates again. This procedure is repeated continuously. When the auxiliary three-dimensional location coordinates set is detected to be an empty set, the circulation stops, and third location coordinates obtained in the last round are determined as aggregated three-dimensional location coordinates. As can be learned from the above, after the circulation is completed, the quantity of the aggregated three-dimensional location coordinates is 1. In the three-dimensional map data, a region corresponding to the aggregated three-dimensional location coordinates is used as the setting region, and a target attribute type is set for a target object in the setting region.

A specific procedure that the server performs aggregation processing on the first location coordinates and the second location coordinates to obtain third location coordinates is as follows: the server determines a confidence of a second region corresponding to two-dimensional location coordinates corresponding to the first location coordinates as a first confidence, and determines a confidence of a second region corresponding to two-dimensional location coordinates corresponding to the second location coordinates as a second confidence. If a difference value between the first confidence and the second confidence is greater than a preset first target difference value, the server determines auxiliary three-dimensional location coordinates corresponding to a larger confidence in the first confidence and the second confidence as third location coordinates. That is, if the first confidence is larger, the server determines the first location coordinates as the third location coordinates; on the contrary, if the second confidence is larger, the server determines the second location coordinates as the third location coordinates.

If the difference value between the first confidence and the second confidence is less than or equal to the preset first target difference value, the server determines a shape of the target attribute type object according to a target attribute type of a second region corresponding to the first location coordinates (or a target attribute type of a second region corresponding to the second location coordinates. Because an overlap degree between the first location coordinates and the second location coordinates meets the overlap error condition, the first location coordinates and the second location coordinates correspond to an object at the same location in three-dimensional map data, and an attribute type of the second region corresponding to the first location coordinates is the same as an attribute type of the second region corresponding to the second location coordinates), which is referred to as a target shape. For example, when the target object is a traffic sign, a shape corresponding to a warning attribute type is a triangle, a shape corresponding to a prohibition attribute type is a circle, and a shape corresponding to a guide attribute type is a rectangle. The server determines a shape of the second region corresponding to the first location coordinates as a first shape, and determines a shape of the second region corresponding to the second location coordinates as a second shape. A shape difference value between the first shape and the second shape detected by the server is referred to as a first shape difference value. If the first shape difference value is less than a preset second target difference value, the first location coordinates and the second location coordinates are combined into third location coordinates. A region corresponding to the third location coordinates in the three-dimensional map data includes a region of the first location coordinates in the three-dimensional map data and a region of the second location coordinates in the three-dimensional map data. To make the third location coordinates more precise, the region corresponding to the third location coordinates in the three-dimensional map data not only includes the region of the first location coordinates in the three-dimensional map data and the region of the second location coordinates in the three-dimensional map data. Moreover, the third location coordinates correspond to a minimum region including the region corresponding to the first location coordinates and the region corresponding to the second location coordinates. If the first shape difference value is greater than or equal to the preset second target difference value, the server compares a second shape difference value between the target shape and the first shape and a second shape difference value between the target shape and the second shape, and determines auxiliary three-dimensional location coordinates of a smaller second shape difference value as the third location coordinates. That is, if the second shape difference value between the target shape and the first shape is smaller, the first location coordinates are determined as the third location coordinates, and if the second shape difference value between the target shape and the second shape is smaller, the second location coordinates are determined as the third location coordinates.

S205. Use, when the result of the overlap degree comparison does not meet the overlap error condition, a region corresponding to the target three-dimensional location coordinates in the three-dimensional map data as a setting region; and set the target attribute type for the target object in the setting region.

Specifically, when the result of the overlap degree comparison does not meet the overlap error condition, a region corresponding to the target three-dimensional location coordinates in the three-dimensional map data is used as a setting region, and the target attribute type is set for the target object in the setting region.

As can be learned from the above, according to the solutions of the present disclosure, an attribute type of an object is recognized automatically from an image including the object. At the same time, three-dimensional location coordinates of the object in a map may be determined automatically according to two-dimensional coordinates of the object in the image and three-dimensional point cloud data, and then an attribute type of the object is displayed in a region in which the three-dimensional location coordinates are located. During setting of an attribute type for an object in a map, recognizing an attribute type, looking up a region in which an object is located, and marking an attribute type for the object are all automatically completed by an electronic device such as a server and a terminal without any human intervention, so that efficiency of marking an attribute type for an object in a map can be improved.

Figure 5:
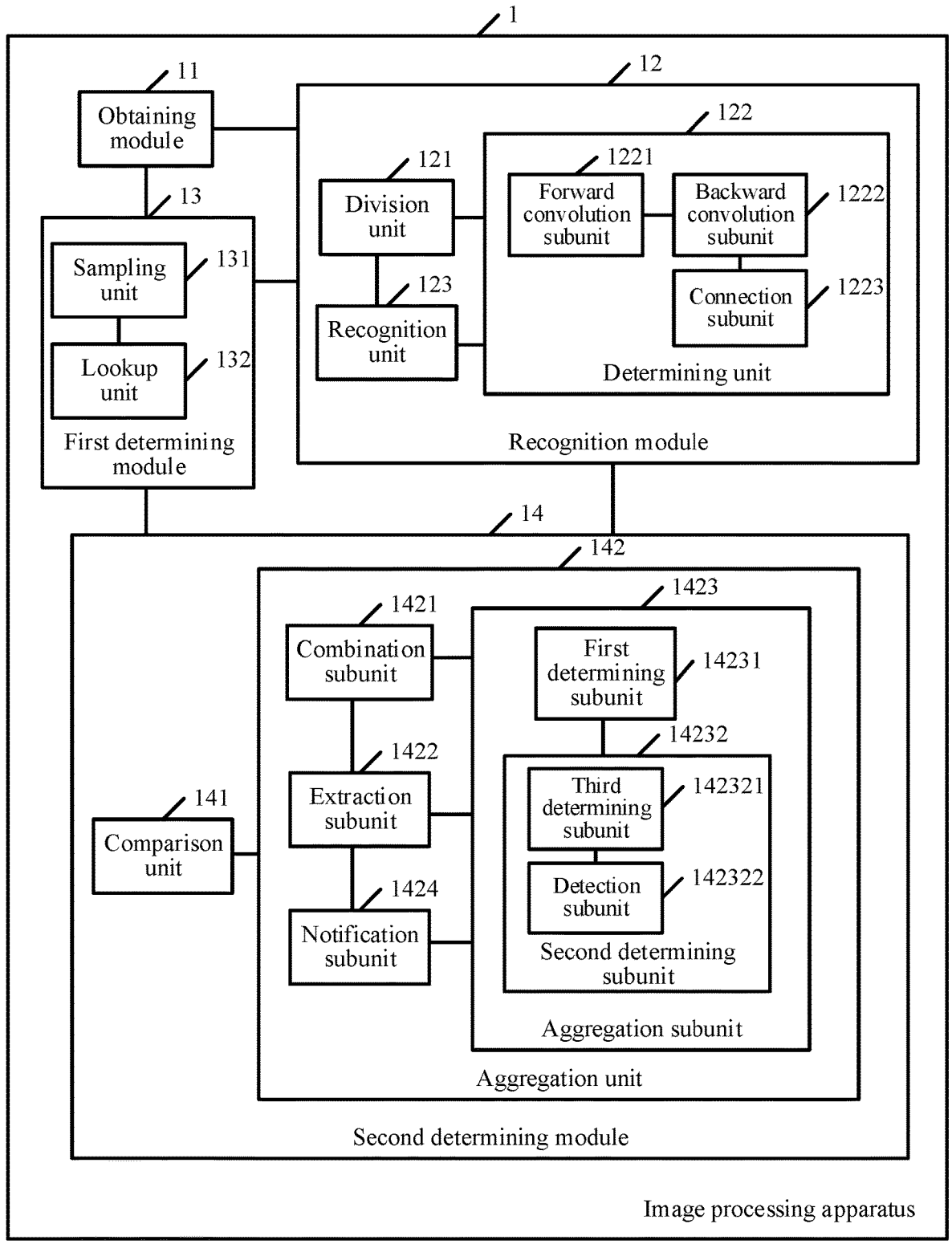
FIG. 5 is a schematic structural diagram of an image processing apparatus according to an embodiment of the present disclosure.

FIG. 5 is a schematic structural diagram of an image processing apparatus according to an embodiment of the present disclosure. The image processing apparatus may be applied to a server in the embodiments corresponding to FIG. 2 to FIG. 4, or applied to a frontend device in the embodiment corresponding to FIG. 2. As shown in FIG. 5, an image processing apparatus 1 may include: an obtaining module 11, a recognition module 12, a first determining module 13, and a second determining module 14.

The first obtaining module 11 is configured to obtain a target image including a target object.

The recognition module 12 is configured to recognize target two-dimensional location coordinates of the target object in the target image and a target attribute type corresponding to the target object.

The obtaining module 11 is further configured to obtain target three-dimensional point cloud associated with the target image.

The first determining module 13 is configured to obtain, according to a mapping relationship between the target three-dimensional point cloud and all pixels in the target image, three-dimensional location coordinates corresponding to pixels in the target two-dimensional location coordinates, and use the obtained three-dimensional location coordinates as target three-dimensional location coordinates.

The second determining module 14 is configured to determine a setting region in three-dimensional map data according to the target three-dimensional location coordinates.

The obtaining module 11 is further configured to set the target attribute type for the target object in the setting region.

For specific function implementations of the obtaining module 11, the recognition module 12, the first determining module 13, and the second determining module 14, reference may be made to S101 to S103 in the embodiment corresponding to FIG. 2, and details are not described herein again.

Referring to FIG. 5, the recognition module 12 may include: a division unit 121, a determining unit 122, and a recognition unit 123.

The division unit 121 is configured to divide the target image into a plurality of target sub-images.

The determining unit 122 is configured to perform convolution processing on the target image based on a convolutional layer in a target detection model, to obtain target convolution feature information corresponding to each target sub-image.

The recognition unit 123 is configured to recognize matching probabilities between the target convolution feature information and a plurality of attribute types in the target detection model, recognize location coordinates corresponding to the target convolution feature information, and use a region corresponding to the location coordinates in the target image as a first region, the plurality of attribute types being types associated with the target object.

The recognition unit 123 is further configured to determine a maximum matching probability as a confidence corresponding to the first region, and use an attribute type corresponding to the maximum matching probability as an attribute type corresponding to the first region.

The recognition unit 123 is further configured to determine a first region whose confidence is greater than a confidence threshold as a second region, determine location coordinates corresponding to the second region as the target two-dimensional location coordinates, and determine an attribute type corresponding to the second region as a target attribute type corresponding to the target object.

For specific function implementations of the division unit 121, the determining unit 122, and the recognition unit 123, reference may be made to S101 in the embodiment corresponding to FIG. 2. Details are not described herein again.

The convolutional layer includes a forward convolutional layer and a backward convolutional layer; the forward convolutional layer includes a first convolutional layer and a second convolutional layer; the second convolutional layer is a convolutional layer located at a top of the forward convolutional layer, and the first convolutional layer is a forward convolutional layer adjacent to the second convolutional layer.

Referring to FIG. 5, the determining unit 122 may include: a forward convolution subunit 1221, a backward convolution subunit 1222, and a connection subunit 1223.

The forward convolution subunit 1221 is configured to perform forward convolution processing on the target image based on the first convolutional layer, to obtain first convolution feature information corresponding to each target sub-image.

The forward convolution subunit 1221 is further configured to perform forward convolution processing on the first convolution feature information based on the second convolutional layer, to obtain second convolution feature information corresponding to each target sub-image.

The backward convolution subunit 1222 is configured to perform backward convolution processing on the second convolution feature information based on the backward convolutional layer, to obtain third convolution feature information corresponding to each target sub-image.

The connection subunit 1223 is configured to connect the first convolution feature information and the third convolution feature information that belong to the same target sub-image, to obtain the target convolution feature information corresponding to each target sub-image.

For specific function implementations of the forward convolution subunit 1221, the backward convolution subunit 1222, and the connection subunit 1223, reference may be made to S101 in the embodiment corresponding to FIG. 2. Details are not described herein again.

Referring to FIG. 5, the first determining module 13 may include: a sampling unit 131 and a lookup unit 132.

The sampling unit 131 is configured to use a horizontal angle and a vertical angle in the target three-dimensional point cloud as sample values, sample the sample values according to a cell value corresponding to the target three-dimensional point cloud, and quantify the sampled sample values to obtain an auxiliary image corresponding to the target three-dimensional point cloud.

The lookup unit 132 is configured to look up for tie points in the target image and the auxiliary image, and establish the mapping relationship between the target three-dimensional point cloud and all the pixels in the target image according to the tie points.

The lookup unit 132 is further configured to use the three-dimensional location coordinates corresponding to the pixels in the target two-dimensional location coordinates as the target three-dimensional location coordinates according to the mapping relationship.

For specific function implementations of the sampling unit 131 and the lookup unit 132, reference may be made to S102 in the embodiment corresponding to FIG. 2. Details are not described herein again.

Referring to FIG. 5, the second determining module 14 may include: a comparison unit 141 and an aggregation unit 142.

The comparison unit 141 is configured to perform an overlap degree comparison on the target three-dimensional location coordinates and reference three-dimensional location coordinates corresponding to a reference image in an image set, the image set including the target image and the reference image, the reference three-dimensional location coordinates being three-dimensional location coordinates corresponding to a reference object in the reference image in the three-dimensional map data, and the reference object and the target object having the same field attribute type.

The aggregation unit 142 is configured to perform, when a result of the overlap degree comparison meets an overlap error condition, aggregation processing on the target three-dimensional location coordinates and the reference three-dimensional location coordinates, to obtain aggregated three-dimensional location coordinates, and use a region corresponding to the aggregated three-dimensional location coordinates in the three-dimensional map data as the setting region.

The comparison unit 141 is further configured to use, when the result of the overlap degree comparison does not meet the overlap error condition, a region corresponding to the target three-dimensional location coordinates in the three-dimensional map data as the setting region.

For specific function implementations of the comparison unit 141 and the aggregation unit 142, reference may be made to S203 to S205 in the embodiment corresponding to FIG. 4. Details are not described herein again.

Referring to FIG. 5, the aggregation unit 142 may include: a combination subunit 1421, an extraction subunit 1422, an aggregation subunit 1423, and a notification subunit 1424.

The combination subunit 1421 is configured to determine both the target three-dimensional location coordinates and the reference three-dimensional location coordinates as auxiliary three-dimensional location coordinates, and combine the auxiliary three-dimensional location coordinates into an auxiliary three-dimensional location coordinates set.

The extraction subunit 1422 is configured to extract, in the auxiliary three-dimensional location coordinates set, a pair of auxiliary three-dimensional location coordinates, which are referred to as first location coordinates and second location coordinates respectively.

The aggregation subunit 1423 is configured to perform aggregation processing on the first location coordinates and the second location coordinates, to obtain third location coordinates.

The notification subunit 1424 is configured to extract next auxiliary three-dimensional location coordinates from the auxiliary three-dimensional location coordinates set as the first location coordinates, determine the third location coordinates as the second location coordinates, inform the aggregation subunit to perform a corresponding operation until the auxiliary three-dimensional location coordinates set is an empty set, and determine third location coordinates obtained in a last round as the aggregated three-dimensional location coordinates.

For specific function implementations of the combination subunit 1421, the extraction subunit 1422, the aggregation subunit 1423, and the notification subunit 1424, reference may be made to S204 in the embodiment corresponding to FIG. 4. Details are not described herein again.

Referring to FIG. 5, the aggregation subunit 1423 may include: a first determining subunit 14231 and a second determining subunit 14232.

The first determining subunit 14231 is configured to determine a confidence of a second region corresponding to the first location coordinates as a first confidence, and determine a confidence of a second region corresponding to the second location coordinates as a second confidence.

The first determining subunit 14231 is further configured to determine, when a difference value between the first confidence and the second confidence is greater than a first target difference value, auxiliary three-dimensional location coordinates corresponding to a larger confidence in the first confidence and the second confidence as the third location coordinates.

The first determining subunit 14231 is further configured to determine, when the difference value between the first confidence and the second confidence is less than or equal to the first target difference value, a target shape according to a target attribute type of the second region corresponding to the first location coordinates.

The second determining subunit 14232 is further configured to determine the third location coordinates according to the target shape, the first location coordinates, and the second location coordinates.

For specific function implementations of the first determining subunit 14231 and the second determining subunit 14232, reference may be made to S204 in the embodiment corresponding to FIG. 4, and details are not described herein again.

Referring to FIG. 5, the second determining subunit 14232 may include: a third determining subunit 142321 and a detection subunit 142322.

The third determining subunit 142321 is configured to determine a first shape according to the first location coordinates, and determine a second shape according to the second location coordinates.

The detection subunit 142322 is configured to detect a first shape difference value between the first shape and the second shape.

The third determining subunit 142321 is further configured to combine, when the first shape difference value is less than a second target difference value, the first location coordinates and the second location coordinates to obtain the third location coordinates, a region of the third location coordinates in the three-dimensional map data including a region of the first location coordinates in the three-dimensional map data and a region of the second location coordinates in the three-dimensional map data.

The third determining subunit 142321 is further configured to compare, when the first shape difference value is greater than or equal to the second target difference value, a second shape difference value between the target shape and the first shape and a second shape difference value between the target shape and the second shape respectively, and use auxiliary three-dimensional location coordinates corresponding to a smaller second shape difference value as the third location coordinates.

For specific function implementations of the third determining subunit 142321 and the detection subunit 142322, reference may be made to S204 in the embodiment corresponding to FIG. 4, and details are not described herein again.

According to the embodiments of the present disclosure, a target image including a target object is obtained, and target two-dimensional location coordinates of the target object in the target image and a target attribute type corresponding to the target object are recognized; a target three-dimensional point cloud associated with the target image is obtained, three-dimensional location coordinates corresponding to pixels in the target two-dimensional location coordinates are obtained according to a mapping relationship between the target three-dimensional point cloud and all pixels in the target image, and the obtained three-dimensional location coordinates are used as target three-dimensional location coordinates; and a setting region is determined in three-dimensional map data according to the target three-dimensional location coordinates, and a target attribute type is set for the target object in the setting region. As can be learned from the above, according to the solution of the present disclosure, an attribute type of an object is recognized automatically from an image including the object. At the same time, three-dimensional location coordinates of the object in a map may be determined automatically according to two-dimensional coordinates of the object in the image and three-dimensional point cloud data, and then an attribute type of the object is set in a region where the three-dimensional location coordinates are located. Therefore, during setting of an attribute type for an object in a map, recognizing an attribute type, looking up a region in which an object is located, and marking an attribute type for the object are all automatically completed by an electronic device such as a server or a terminal without any human intervention, so that efficiency of marking an attribute type for an object in a map can be improved.

Figure 6:
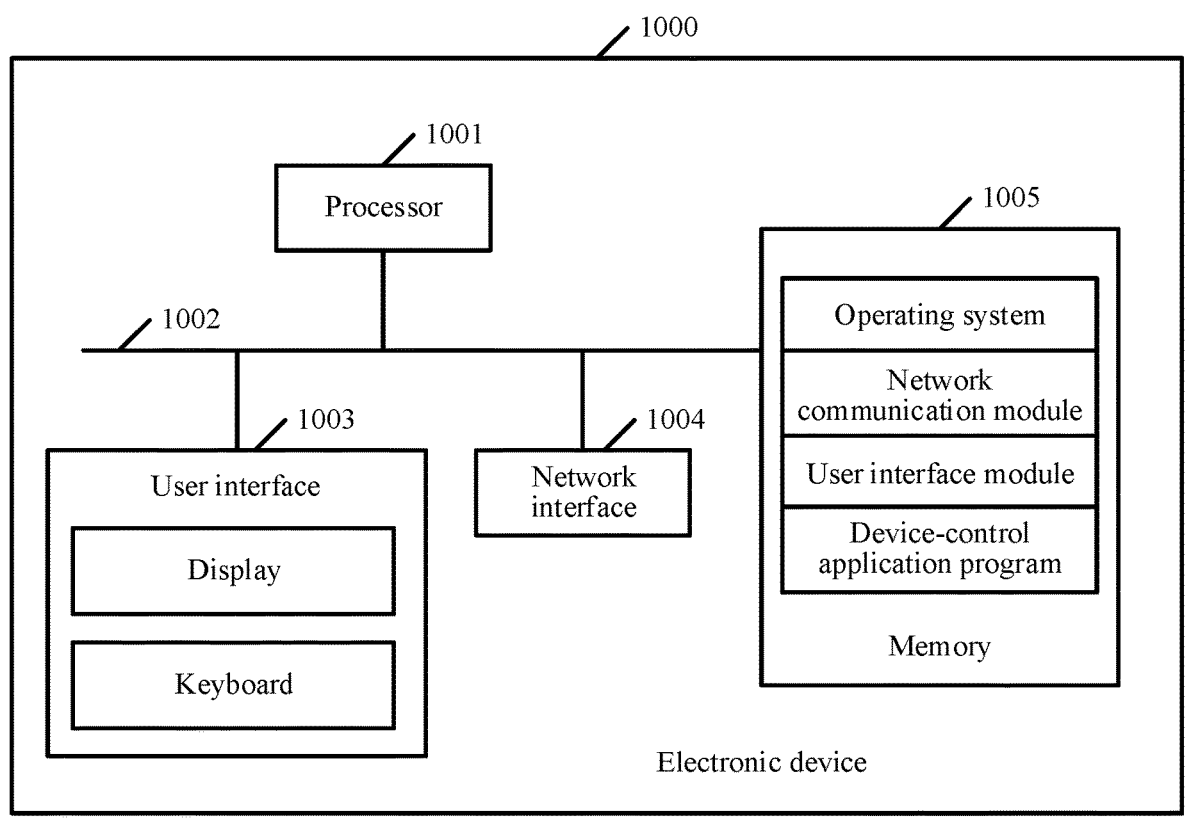
FIG. 6 is a schematic structural diagram of an electronic device according to an embodiment of the present disclosure.

Further, FIG. 6 is a schematic structural diagram of an electronic device according to an embodiment of the present disclosure. As shown in FIG. 6, the image processing apparatus 1 in FIG. 5 may be applied to the electronic device 1000. The electronic device 1000 may include: a processor 1001, a network interface 1004, and a memory 1005. In addition, the electronic device 1000 may further include: a user interface 1003 and at least one communication bus 1002. The communication bus 1002 is configured to implement connection and communication between these components. The user interface 1003 may include a display and a keyboard. Optionally, the user interface 1003 may further include a standard wired interface and a wireless interface. Optionally, the network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may further be at least one storage apparatus that is located far away from the processor 1001. As shown in FIG. 6, the memory 1005 used as a non-volatile computer storage medium may include an operating system, a network communication module, a user interface module, and a device-control application program.

The electronic device 1000 may be the server in the embodiments corresponding to FIG. 2 to FIG. 4, or may be the frontend device (the terminal) in the embodiment corresponding to FIG. 2. In the electronic device 1000 shown in FIG. 6, the network interface 1004 may provide a network communication function. The user interface 1003 is mainly configured to provide an input interface for a user. The processor 1001 may be configured to call the device-control application program stored in the memory 1005, to implement the following operations: obtaining a target image including a target object, and recognizing target two-dimensional location coordinates of the target object in the target image and a target attribute type corresponding to the target object; obtaining a target three-dimensional point cloud associated with the target image, obtaining, according to a mapping relationship between the target three-dimensional point cloud and all pixels in the target image, three-dimensional location coordinates corresponding to pixels in the target two-dimensional location coordinates, and using the obtained three-dimensional location coordinates as target three-dimensional location coordinates; and determining a setting region in three-dimensional map data according to the target three-dimensional location coordinates, and setting the target attribute type for the target object in the setting region.

In an embodiment, when recognizing the target two-dimensional location coordinates of the target object in the target image and the target attribute type corresponding to the target object, the processor 1001 specifically performs the following operations: dividing the target image into a plurality of target sub-images, and performing convolution processing on the target image based on a convolutional layer in a target detection model, to obtain target convolution feature information corresponding to each target sub-image; recognizing matching probabilities between the target convolution feature information and a plurality of attribute types in the target detection model, recognizing location coordinates corresponding to the target convolution feature information, and using a region corresponding to the location coordinates in the target image as a first region, the plurality of attribute types being types associated with the target object; determining a maximum matching probability as a confidence corresponding to the first region, and using an attribute type corresponding to the maximum matching probability as an attribute type corresponding to the first region; and determining a first region whose confidence is greater than a confidence threshold as a second region, determining location coordinates corresponding to the second region as the target two-dimensional location coordinates, and determining an attribute type corresponding to the second region as the target attribute type corresponding to the target object.

In an embodiment, the convolutional layer includes a forward convolutional layer and a backward convolutional layer; the forward convolutional layer includes a first convolutional layer and a second convolutional layer; the second convolutional layer is a convolutional layer located at a top of the forward convolutional layer, and the first convolutional layer is a forward convolutional layer adjacent to the second convolutional layer.

When performing convolution processing on the target image based on the convolutional layer in the target detection model to obtain the target convolution feature information corresponding to each target sub-image, the processor 1001 specifically performs the following operations: performing forward convolution processing on the target image based on the first convolutional layer, to obtain first convolution feature information corresponding to each target sub-image; performing forward convolution processing on the first convolution feature information based on the second convolutional layer, to obtain second convolution feature information corresponding to each target sub-image; performing backward convolution processing on the second convolution feature information based on the backward convolutional layer, to obtain third convolution feature information corresponding to each target sub-image; and connecting the first convolution feature information and the third convolution feature information that belong to the same target sub-image, to obtain the target convolution feature information corresponding to each target sub-image.

In an embodiment, when obtaining, according to the mapping relationship between the target three-dimensional point cloud and all the pixels in the target image, the three-dimensional location coordinates corresponding to the pixels in the target two-dimensional location coordinates, and using the obtained three-dimensional location coordinates as the target three-dimensional location coordinates, the processor 1001 specifically performs the following operations: using a horizontal angle and a vertical angle in the target three-dimensional point cloud as sample values, sampling the sample values according to a cell value corresponding to the target three-dimensional point cloud, and quantifying the sampled sample values to obtain an auxiliary image corresponding to the target three-dimensional point cloud; looking up for tie points in the target image and the auxiliary image, and establishing the mapping relationship between the target three-dimensional point cloud and all the pixels in the target image according to the tie points; and using the three-dimensional location coordinates corresponding to the pixels in the target two-dimensional location coordinates as the target three-dimensional location coordinates according to the mapping relationship.

In an embodiment, when determining the setting region in the three-dimensional map data according to the target three-dimensional location coordinates, the processor 1001 specifically performs the following operations: performing an overlap degree comparison on the target three-dimensional location coordinates and reference three-dimensional location coordinates corresponding to a reference image in an image set, the image set including the target image and the reference image, the reference three-dimensional location coordinates being three-dimensional location coordinates corresponding to a reference object in the reference image in the three-dimensional map data, and the reference object and the target object having the same field attribute type; performing, when a result of the overlap degree comparison meets an overlap error condition, aggregation processing on the target three-dimensional location coordinates and the reference three-dimensional location coordinates, to obtain aggregated three-dimensional location coordinates, and using a region corresponding to the aggregated three-dimensional location coordinates in the three-dimensional map data as the setting region; and using, when the result of the overlap degree comparison does not meet the overlap error condition, a region corresponding to the target three-dimensional location coordinates in the three-dimensional map data as the setting region.

In an embodiment, when performing aggregation processing on the target three-dimensional location coordinates and the reference three-dimensional location coordinates to obtain the aggregated three-dimensional location coordinates, the processor 1001 specifically performs the following operations: determining both the target three-dimensional location coordinates and the reference three-dimensional location coordinates as auxiliary three-dimensional location coordinates, and combining the auxiliary three-dimensional location coordinates into an auxiliary three-dimensional location coordinates set; extracting a pair of auxiliary three-dimensional location coordinates in the auxiliary three-dimensional location coordinates set as first location coordinates and second location coordinates respectively; and performing aggregation processing on the first location coordinates and the second location coordinates to obtain third location coordinates, extracting next auxiliary three-dimensional location coordinates from the auxiliary three-dimensional location coordinates set as the first location coordinates, determining the third location coordinates as the second location coordinates to perform a next round of aggregation processing until the auxiliary three-dimensional location coordinates set is an empty set, and determining third location coordinates obtained in a last round as the aggregated three-dimensional location coordinates.

In an embodiment, when performing aggregation processing on the first location coordinates and the second location coordinates to obtain the third location coordinates, the processor 1001 specifically performs the following operations: determining a confidence of a second region corresponding to the first location coordinates as a first confidence, and determining a confidence of a second region corresponding to the second location coordinates as a second confidence; determining, when a difference value between the first confidence and the second confidence is greater than a first target difference value, auxiliary three-dimensional location coordinates corresponding to a larger confidence in the first confidence and the second confidence as the third location coordinates; and determining, when the difference value between the first confidence and the second confidence is less than or equal to the first target difference value, a target shape according to a target attribute type of the second region corresponding to the first location coordinates, and determining the third location coordinates according to the target shape, the first location coordinates, and the second location coordinates.

In an embodiment, when determining the third location coordinates according to the target shape, the first location coordinates, and the second location coordinates, the processor 1001 specifically performs the following operations: determining a first shape according to the first location coordinates and determining a second shape according to the second location coordinates; detecting a first shape difference value between the first shape and the second shape; combining, when the first shape difference value is less than a second target difference value, the first location coordinates and the second location coordinates to obtain the third location coordinates, a region of the third location coordinates in the three-dimensional map data comprising a region of the first location coordinates in the three-dimensional map data and a region of the second location coordinates in the three-dimensional map data; and comparing, when the first shape difference value is greater than or equal to the second target difference value, a second shape difference value between the target shape and the first shape and a second shape difference value between the target shape and the second shape respectively, and using auxiliary three-dimensional location coordinates corresponding to a smaller second shape difference value as the third location coordinates.

As can be learned from the above, according to the solutions of the present disclosure, an attribute type of an object is recognized automatically from an image including the object. At the same time, three-dimensional location coordinates of the object in a map may be determined automatically according to two-dimensional coordinates of the object in the image and three-dimensional point cloud data, and then an attribute type of the object is displayed in a region in which the three-dimensional location coordinates are located. During setting of an attribute type for an object in a map, recognizing an attribute type, looking up a region in which an object is located, and marking an attribute type for the object are all automatically completed by an electronic device such as a server and a terminal without any human intervention, so that efficiency of marking an attribute type for an object in a map can be improved.

The electronic device 1000 described in this embodiment of the present disclosure may implement the descriptions of the image processing method in the embodiments corresponding to FIG. 2 to FIG. 4, or the descriptions of the image processing apparatus 1 in the embodiment corresponding to FIG. 5. Details are not described herein again. In addition, beneficial effects of using the same methods are not described herein again.

In addition, an embodiment of the present disclosure further provides a computer storage medium. The computer storage medium stores a computer program executed by the image processing apparatus 1 mentioned above, and the computer program includes a program instruction. When executing the program instruction, the processor can implement the descriptions of the image processing method in the embodiments corresponding to FIG. 2 to FIG. 4. Therefore, details are not described herein again. In addition, beneficial effects of using the same methods are not described herein again. For technical details that are not disclosed in the embodiments of the computer storage medium of the present disclosure, refer to the method embodiments of the present disclosure.

A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The storage medium may be a magnetic disk, an optical disc, a read-only memory (ROM) or a random access memory (RAM), or the like.

The foregoing disclosure is merely embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An image processing method for an electronic device, comprising:
    obtaining a target image comprising a target object;
    recognizing target two-dimensional location coordinates of the target object in the target image and a target attribute type corresponding to the target object;
    obtaining a target three-dimensional point cloud associated with the target image;
    according to a mapping relationship between the target three-dimensional point cloud and all pixels in the target image, obtaining three-dimensional location coordinates corresponding to pixels in the target two-dimensional location coordinates, as target three-dimensional location coordinates;
    determining a setting region in three-dimensional map data according to the target three-dimensional location coordinates; and
    setting the target attribute type for the target object in the setting region.

2. The method according to claim 1, wherein the recognizing target two-dimensional location coordinates of the target object in the target image and a target attribute type corresponding to the target object comprises:
    dividing the target image into a plurality of target sub-images, and performing convolution processing on the target image based on a convolutional layer in a target detection model, to obtain target convolution feature information corresponding to each target sub-image;
    recognizing matching probabilities between the target convolution feature information and a plurality of attribute types in the target detection model, recognizing location coordinates corresponding to the target convolution feature information, and using a region corresponding to the location coordinates in the target image as a first region, the plurality of attribute types being types associated with the target object;
    determining a maximum matching probability as a confidence corresponding to the first region, and using an attribute type corresponding to the maximum matching probability as an attribute type corresponding to the first region; and
    determining a first region whose confidence is greater than a confidence threshold as a second region, determining location coordinates corresponding to the second region as the target two-dimensional location coordinates, and determining an attribute type corresponding to the second region as the target attribute type corresponding to the target object.

3. The method according to claim 2, wherein:
    the convolutional layer comprises a forward convolutional layer and a backward convolutional layer; the forward convolutional layer comprises a first convolutional layer and a second convolutional layer; the second convolutional layer is a convolutional layer located at a top of the forward convolutional layer, and the first convolutional layer is a forward convolutional layer adjacent to the second convolutional layer; and
    the performing convolution processing on the target image based on a convolutional layer in a target detection model, to obtain target convolution feature information corresponding to each target sub-image comprises:
    performing forward convolution processing on the target image based on the first convolutional layer, to obtain first convolution feature information corresponding to each target sub-image;
    performing forward convolution processing on the first convolution feature information based on the second convolutional layer, to obtain second convolution feature information corresponding to each target sub-image;
    performing backward convolution processing on the second convolution feature information based on the backward convolutional layer, to obtain third convolution feature information corresponding to each target sub-image; and
    connecting the first convolution feature information and the third convolution feature information that belong to the same target sub-image, to obtain the target convolution feature information corresponding to each target sub-image.

4. The method according to claim 2, wherein the determining a setting region in three-dimensional map data according to the target three-dimensional location coordinates comprises:
    performing an overlap degree comparison on the target three-dimensional location coordinates and reference three-dimensional location coordinates corresponding to a reference image in an image set, the image set comprising the target image and the reference image, the reference three-dimensional location coordinates being three-dimensional location coordinates corresponding to a reference object in the reference image in the three-dimensional map data, and the reference object and the target object having the same field attribute type;

when a result of the overlap degree comparison meets an overlap error condition, performing aggregation processing on the target three-dimensional location coordinates and the reference three-dimensional location coordinates, to obtain aggregated three-dimensional location coordinates, and using a region corresponding to the aggregated three-dimensional location coordinates in the three-dimensional map data as the setting region; and when the result of the overlap degree comparison does not meet the overlap error condition, using a region corresponding to the target three-dimensional location coordinates in the three-dimensional map data as the setting region.

5. The method according to claim 4, wherein the performing aggregation processing on the target three-dimensional location coordinates and the reference three-dimensional location coordinates, to obtain aggregated three-dimensional location coordinates comprises:

determining both the target three-dimensional location coordinates and the reference three-dimensional location coordinates as auxiliary three-dimensional location coordinates, and combining the auxiliary three-dimensional location coordinates into an auxiliary three-dimensional location coordinates set;

extracting a pair of auxiliary three-dimensional location coordinates in the auxiliary three-dimensional location coordinates set as first location coordinates and second location coordinates respectively; and performing aggregation processing on the first location coordinates and the second location coordinates to obtain third location coordinates, extracting next auxiliary three-dimensional location coordinates from the auxiliary three-dimensional location coordinates set as the first location coordinates, determining the third location coordinates as the second location coordinates to perform a next round of aggregation processing until the auxiliary three-dimensional location coordinates set is an empty set, and determining third location coordinates obtained in a last round as the aggregated three-dimensional location coordinates.

6. The method according to claim 5, wherein the performing aggregation processing on the first location coordinates and the second location coordinates to obtain third location coordinates comprises:

determining a confidence of a second region corresponding to the first location coordinates as a first confidence, and determining a confidence of a second region corresponding to the second location coordinates as a second confidence;

when a difference value between the first confidence and the second confidence is greater than a first target difference value, determining auxiliary three-dimensional location coordinates corresponding to a larger confidence in the first confidence and the second confidence as the third location coordinates; and when the difference value between the first confidence and the second confidence is less than or equal to the first target difference value, determining a target shape according to a target attribute type of the second region corresponding to the first location coordinates, and determining the third location coordinates according to the target shape, the first location coordinates, and the second location coordinates.

7. The method according to the claim 6, wherein the determining the third location coordinates according to the target shape, the first location coordinates, and the second location coordinates comprises:

determining a first shape according to the first location coordinates and determining a second shape according to the second location coordinates;

detecting a first shape difference value between the first shape and the second shape;

combining, when the first shape difference value is less than a second target difference value, the first location coordinates and the second location coordinates to obtain the third location coordinates, a region of the third location coordinates in the three-dimensional map data comprising a region of the first location coordinates in the three-dimensional map data and a region of the second location coordinates in the three-dimensional map data; and comparing, when the first shape difference value is greater than or equal to the second target difference value, a second shape difference value between the target shape and the first shape and a second shape difference value between the target shape and the second shape respectively, and using auxiliary three-dimensional location coordinates corresponding to a smaller second shape difference value as the third location coordinates.

8. The method according to claim 1, wherein the obtaining three-dimensional location coordinates corresponding to pixels in the target two-dimensional location coordinates, as target three-dimensional location coordinates comprises:

using a horizontal angle and a vertical angle in the target three-dimensional point cloud as sample values, sampling the sample values according to a cell value corresponding to the target three-dimensional point cloud, and quantifying the sampled sample values to obtain an auxiliary image corresponding to the target three-dimensional point cloud;

looking up for tie points in the target image and the auxiliary image, and establishing the mapping relationship between the target three-dimensional point cloud and all the pixels in the target image according to the tie points; and using the three-dimensional location coordinates corresponding to the pixels in the target two-dimensional location coordinates as the target three-dimensional location coordinates according to the mapping relationship.

9. An electronic device, comprising
a memory storing computer program instructions; and
a processor coupled to the memory and, when executing the computer program instructions, configured to perform:

obtaining a target image comprising a target object;

recognizing target two-dimensional location coordinates of the target object in the target image and a target attribute type corresponding to the target object;

obtaining a target three-dimensional point cloud associated with the target image;

according to a mapping relationship between the target three-dimensional point cloud and all pixels in the target image, obtaining three-dimensional location coordinates corresponding to pixels in the target two-dimensional location coordinates, as target three-dimensional location coordinates;

determining a setting region in three-dimensional map data according to the target three-dimensional location coordinates; and setting the target attribute type for the target object in the setting region.

10. The electronic device according to claim 9, wherein the recognizing target two-dimensional location coordinates of the target object in the target image and a target attribute type corresponding to the target object comprises:

dividing the target image into a plurality of target sub-images, and performing convolution processing on the target image based on a convolutional layer in a target detection model, to obtain target convolution feature information corresponding to each target sub-image;

recognizing matching probabilities between the target convolution feature information and a plurality of attribute types in the target detection model, recognizing location coordinates corresponding to the target convolution feature information, and using a region corresponding to the location coordinates in the target image as a first region, the plurality of attribute types being types associated with the target object;

determining a maximum matching probability as a confidence corresponding to the first region, and using an attribute type corresponding to the maximum matching probability as an attribute type corresponding to the first region; and determining a first region whose confidence is greater than a confidence threshold as a second region, determining location coordinates corresponding to the second region as the target two-dimensional location coordinates, and determining an attribute type corresponding to the second region as the target attribute type corresponding to the target object.

11. The electronic device according to claim 10, wherein:

the convolutional layer comprises a forward convolutional layer and a backward convolutional layer; the forward convolutional layer comprises a first convolutional layer and a second convolutional layer; the second convolutional layer is a convolutional layer located at a top of the forward convolutional layer, and the first convolutional layer is a forward convolutional layer adjacent to the second convolutional layer; and the performing convolution processing on the target image based on a convolutional layer in a target detection model, to obtain target convolution feature information corresponding to each target sub-image comprises:

performing forward convolution processing on the target image based on the first convolutional layer, to obtain first convolution feature information corresponding to each target sub-image;

performing forward convolution processing on the first convolution feature information based on the second convolutional layer, to obtain second convolution feature information corresponding to each target sub-image;

performing backward convolution processing on the second convolution feature information based on the backward convolutional layer, to obtain third convolution feature information corresponding to each target sub-image; and connecting the first convolution feature information and the third convolution feature information that belong to the same target sub-image, to obtain the target convolution feature information corresponding to each target sub-image.

12. The electronic device according to claim 10, wherein the determining a setting region in three-dimensional map data according to the target three-dimensional location coordinates comprises:

performing an overlap degree comparison on the target three-dimensional location coordinates and reference three-dimensional location coordinates corresponding to a reference image in an image set, the image set comprising the target image and the reference image, the reference three-dimensional location coordinates being three-dimensional location coordinates corresponding to a reference object in the reference image in the three-dimensional map data, and the reference object and the target object having the same field attribute type;

when a result of the overlap degree comparison meets an overlap error condition, performing aggregation processing on the target three-dimensional location coordinates and the reference three-dimensional location coordinates, to obtain aggregated three-dimensional location coordinates, and using a region corresponding to the aggregated three-dimensional location coordinates in the three-dimensional map data as the setting region; and when the result of the overlap degree comparison does not meet the overlap error condition, using a region corresponding to the target three-dimensional location coordinates in the three-dimensional map data as the setting region.

13. The electronic device according to claim 12, wherein the performing aggregation processing on the target three-dimensional location coordinates and the reference three-dimensional location coordinates, to obtain aggregated three-dimensional location coordinates comprises:

determining both the target three-dimensional location coordinates and the reference three-dimensional location coordinates as auxiliary three-dimensional location coordinates, and combining the auxiliary three-dimensional location coordinates into an auxiliary three-dimensional location coordinates set;

extracting a pair of auxiliary three-dimensional location coordinates in the auxiliary three-dimensional location coordinates set as first location coordinates and second location coordinates respectively; and performing aggregation processing on the first location coordinates and the second location coordinates to obtain third location coordinates, extracting next auxiliary three-dimensional location coordinates from the auxiliary three-dimensional location coordinates set as the first location coordinates, determining the third location coordinates as the second location coordinates to perform a next round of aggregation processing until the auxiliary three-dimensional location coordinates set is an empty set, and determining third location coordinates obtained in a last round as the aggregated three-dimensional location coordinates.

14. The electronic device according to claim 13, wherein the performing aggregation processing on the first location coordinates and the second location coordinates to obtain third location coordinates comprises:

determining a confidence of a second region corresponding to the first location coordinates as a first confidence, and determining a confidence of a second region corresponding to the second location coordinates as a second confidence;

when a difference value between the first confidence and the second confidence is greater than a first target difference value, determining auxiliary three-dimensional location coordinates corresponding to a larger confidence in the first confidence and the second confidence as the third location coordinates; and when the difference value between the first confidence and the second confidence is less than or equal to the first target difference value, determining a target shape according to a target attribute type of the second region corresponding to the first location coordinates, and determining the third location coordinates according to the target shape, the first location coordinates, and the second location coordinates.

15. The electronic device according to the claim 14, wherein the determining the third location coordinates according to the target shape, the first location coordinates, and the second location coordinates comprises:

determining a first shape according to the first location coordinates and determining a second shape according to the second location coordinates;

detecting a first shape difference value between the first shape and the second shape;

combining, when the first shape difference value is less than a second target difference value, the first location coordinates and the second location coordinates to obtain the third location coordinates, a region of the third location coordinates in the three-dimensional map data comprising a region of the first location coordinates in the three-dimensional map data and a region of the second location coordinates in the three-dimensional map data; and comparing, when the first shape difference value is greater than or equal to the second target difference value, a second shape difference value between the target shape and the first shape and a second shape difference value between the target shape and the second shape respectively, and using auxiliary three-dimensional location coordinates corresponding to a smaller second shape difference value as the third location coordinates.

16. The electronic device according to claim 9, wherein the obtaining three-dimensional location coordinates corresponding to pixels in the target two-dimensional location coordinates, as target three-dimensional location coordinates comprises:

using a horizontal angle and a vertical angle in the target three-dimensional point cloud as sample values, sampling the sample values according to a cell value corresponding to the target three-dimensional point cloud, and quantifying the sampled sample values to obtain an auxiliary image corresponding to the target three-dimensional point cloud;

looking up for tie points in the target image and the auxiliary image, and establishing the mapping relationship between the target three-dimensional point cloud and all the pixels in the target image according to the tie points; and using the three-dimensional location coordinates corresponding to the pixels in the target two-dimensional location coordinates as the target three-dimensional location coordinates according to the mapping relationship.

17. A non-transitory computer-readable storage medium storing computer program instructions executable by at least one processor to perform:

obtaining a target image comprising a target object;

recognizing target two-dimensional location coordinates of the target object in the target image and a target attribute type corresponding to the target object;

obtaining a target three-dimensional point cloud associated with the target image;

according to a mapping relationship between the target three-dimensional point cloud and all pixels in the target image, obtaining three-dimensional location coordinates corresponding to pixels in the target two-dimensional location coordinates, as target three-dimensional location coordinates;

determining a setting region in three-dimensional map data according to the target three-dimensional location coordinates; and setting the target attribute type for the target object in the setting region.

18. The non-transitory computer-readable storage medium according to claim 17, wherein the recognizing target two-dimensional location coordinates of the target object in the target image and a target attribute type corresponding to the target object comprises:

dividing the target image into a plurality of target sub-images, and performing convolution processing on the target image based on a convolutional layer in a target detection model, to obtain target convolution feature information corresponding to each target sub-image;

recognizing matching probabilities between the target convolution feature information and a plurality of attribute types in the target detection model, recognizing location coordinates corresponding to the target convolution feature information, and using a region corresponding to the location coordinates in the target image as a first region, the plurality of attribute types being types associated with the target object;

determining a maximum matching probability as a confidence corresponding to the first region, and using an attribute type corresponding to the maximum matching probability as an attribute type corresponding to the first region; and determining a first region whose confidence is greater than a confidence threshold as a second region, determining location coordinates corresponding to the second region as the target two-dimensional location coordinates, and determining an attribute type corresponding to the second region as the target attribute type corresponding to the target object.

19. The non-transitory computer-readable storage medium according to claim 18, wherein:

the convolutional layer comprises a forward convolutional layer and a backward convolutional layer; the forward convolutional layer comprises a first convolutional layer and a second convolutional layer; the second convolutional layer is a convolutional layer located at a top of the forward convolutional layer, and the first convolutional layer is a forward convolutional layer adjacent to the second convolutional layer; and the performing convolution processing on the target image based on a convolutional layer in a target detection model, to obtain target convolution feature information corresponding to each target sub-image comprises:

performing forward convolution processing on the target image based on the first convolutional layer, to obtain first convolution feature information corresponding to each target sub-image;

performing forward convolution processing on the first convolution feature information based on the second convolutional layer, to obtain second convolution feature information corresponding to each target sub-image;

performing backward convolution processing on the second convolution feature information based on the backward convolutional layer, to obtain third convolution feature information corresponding to each target sub-image; and connecting the first convolution feature information and the third convolution feature information that belong to the same target sub-image, to obtain the target convolution feature information corresponding to each target sub-image.

20. The non-transitory computer-readable storage medium according to claim 17, wherein the obtaining three-dimensional location coordinates corresponding to pixels in the target two-dimensional location coordinates, as target three-dimensional location coordinates comprises:

using a horizontal angle and a vertical angle in the target three-dimensional point cloud as sample values, sampling the sample values according to a cell value corresponding to the target three-dimensional point cloud, and quantifying the sampled sample values to obtain an auxiliary image corresponding to the target three-dimensional point cloud;

looking up for tie points in the target image and the auxiliary image, and establishing the mapping relationship between the target three-dimensional point cloud and all the pixels in the target image according to the tie points; and using the three-dimensional location coordinates corresponding to the pixels in the target two-dimensional location coordinates as the target three-dimensional location coordinates according to the mapping relationship.

* * * * *